(12) United States Patent
Hirata et al.

(10) Patent No.: US 8,675,457 B1
(45) Date of Patent: Mar. 18, 2014

(54) NEAR-FIELD LIGHT GENERATOR INCLUDING A PLASMON GENERATOR AND A WAVEGUIDE

(71) Applicant: TDK Corporation, Tokyo (JP)

(72) Inventors: Kei Hirata, Tokyo (JP); Keita Kawamori, Tokyo (JP); Nobuyuki Mori, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/687,552

(22) Filed: Nov. 28, 2012

(51) Int. Cl.
*G11B 11/00* (2006.01)
(52) U.S. Cl.
USPC ........................................ 369/13.33
(58) Field of Classification Search
USPC .......................................... 369/13.14, 13.33
See application file for complete search history.

(56) References Cited

U.S. PATENT DOCUMENTS

| | | | |
|---|---|---|---|
| 8,170,389 B1 | 5/2012 | Komura et al. | |
| 8,228,634 B2 * | 7/2012 | Jin et al. | 360/125.31 |
| 2011/0164334 A1 | 7/2011 | Jin et al. | |
| 2011/0170381 A1 | 7/2011 | Matsumoto | |
| 2011/0235480 A1 | 9/2011 | Goulakov et al. | |

OTHER PUBLICATIONS

Herschend et al., "Characterization of the Metal-Ceramic Bonding in the Ag/MgO(001) Interface from ab Initio Calculations," *J. Phys. Chem. B*, (2003), 107, pp. 11893-11899, Oct. 7, 2003.
Zhukovskii et al., "Hartree-Fock study of adhesion and charge redistribution on the Ag/MgO(001) interface," *Surface Science*, (2001), vols. 482-485, Part 1, pp. 66-72, Jun. 20, 2001.
Chin et al., "Effect of the Tantalum Barrier Layer on the Electromigration and Stress Migration Resistance of Physical-Vapor-Deposited Copper Interconnect," *Japanese Journal of Applied Physics 41*, (2002), vol. 41, Part 1, No. 5A, pp. 3057-3064, May 2002.

* cited by examiner

*Primary Examiner* — Brenda Bernardi
(74) *Attorney, Agent, or Firm* — Oliff PLC

(57) ABSTRACT

A near-field light generator includes a waveguide, a plasmon generator, and an MgO layer. The waveguide includes a core and a cladding. The plasmon generator has an outer surface including a plasmon exciting part and a near-field light generating part, and is configured so that a surface plasmon is excited on the plasmon exciting part based on light propagating through the core, and the near-field light generating part generates near-field light based on the surface plasmon. The MgO layer is in contact with at least part of the outer surface of the plasmon generator excluding the near-field light generating part, and not in contact with the core. The cladding is lower in refractive index than the core and the MgO layer.

10 Claims, 21 Drawing Sheets

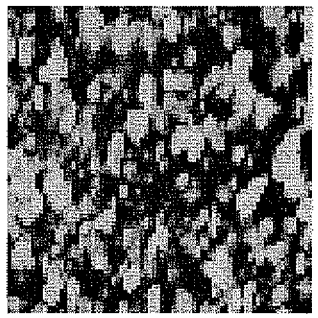
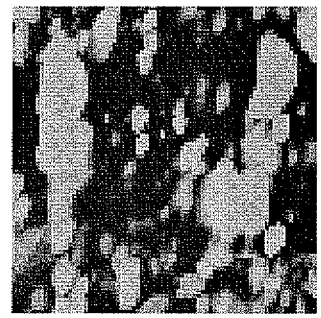
FIG. 9A
RELATED ART
FIG. 9B
RELATED ART
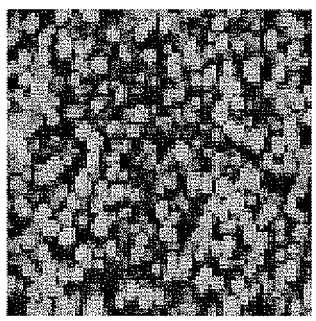
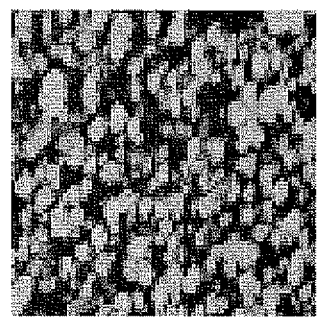
FIG. 10A
FIG. 10B

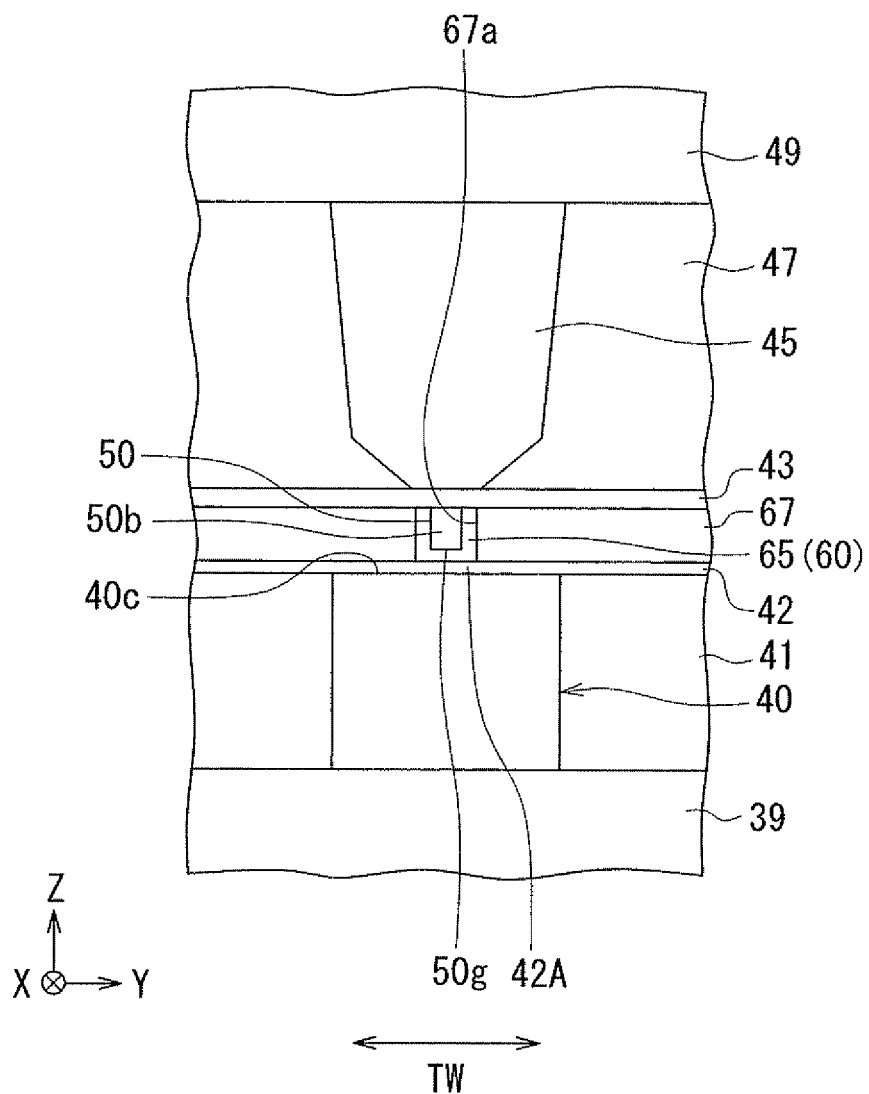
F I G. 22

NEAR-FIELD LIGHT GENERATOR INCLUDING A PLASMON GENERATOR AND A WAVEGUIDE

BACKGROUND OF THE INVENTION

1. Field of the Invention

The present invention relates to a near-field light generator including a plasmon generator and a waveguide, and to a thermally-assisted magnetic recording head including the near-field light generator.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with light. The light for use in generating near-field light is typically guided through a waveguide, which is provided in the slider, to the plasmon generator disposed near the medium facing surface of the slider. The medium facing surface is the surface to face the magnetic recording medium. The waveguide includes a core through which light propagates, and a cladding provided around the core. The cladding has a refractive index lower than that of the core.

In a thermally-assisted magnetic recording head including a plasmon generator and a waveguide, the plasmon generator and the core of the waveguide are disposed close to each other in the vicinity of the medium facing surface. Thermally-assisted magnetic recording heads having such a configuration are disclosed in, for example, U.S. Patent Application Publication Nos. 2011/0164334 A1, 2011/0170381 A1 and 2011/0235480 A1, and U.S. Pat. No. 8,170,389 B1.

Part of the energy of the light guided to the plasmon generator through the waveguide is transformed into heat in the plasmon generator. The plasmon generator thus rises in temperature during the operation of the thermally-assisted magnetic recording head. A considerable rise in temperature of the plasmon generator may cause the following phenomenon, possibly impairing the reliability of the thermally-assisted magnetic recording head. Specifically, there is a possibility that the plasmon generator may expand and protrude from the medium facing surface to cause damage to the magnetic recording medium or to the plasmon generator itself. Furthermore, a considerable rise in temperature of the plasmon generator may also cause the plasmon generator to be deformed due to migration of atoms of the material forming the plasmon generator. This may cause the plasmon generator to become unable to provide a desired heating capability. Thus, it is critical with thermally-assisted magnetic recording heads to prevent a rise in temperature of the plasmon generator.

To prevent a rise in temperature of the plasmon generator, the plasmon generator is preferably formed of a material that has a low dielectric loss. Forming the plasmon generator of a material having a low dielectric loss will reduce the amount of absorbed energy caused by dielectric loss inside the plasmon generator, and will thereby reduce the amount of heat generated by the plasmon generator. The relative permittivity of a material is expressed as $n^2-k^2+i2nk$, where n and k are the refractive index and the extinction coefficient of the material, respectively. The greater the imaginary part $2nk$ of the relative permittivity, the greater the dielectric loss becomes. Thus, the plasmon generator is preferably formed of a material that has a reduced value of $2nk$. Examples of such a material include one metal selected from the group consisting of Au, Ag, Cu and Al, and an alloy containing at least one of these metals.

However, Au, Ag, Cu, and Al are relatively soft metals. A plasmon generator formed of any of these materials thus has a drawback that, when the plasmon generator is at an elevated temperature, growth or aggregation of crystal grains will occur due to internal strain, relaxation of surface energy, or stress migration caused by thermal stress, and this will cause the plasmon generator to be susceptible to deformation. Such deformation of the plasmon generator tends to occur particularly when the plasmon generator has low adhesion to a material in contact therewith.

A thermally-assisted magnetic recording head including a plasmon generator and a waveguide is often configured so that the material forming the cladding in contact with the core is brought into contact with part of the outer surface of the plasmon generator other than the end face located in the medium facing surface. The cladding is often formed of $Al_2O_3$ (hereafter, also referred to as alumina) or $SiO_2$. Au and Ag have low adhesion to alumina and $SiO_2$. Thus, if a plasmon generator formed of Au or Ag is in contact with a cladding formed of alumina or $SiO_2$, deformation of the plasmon generator tends to occur as mentioned above.

U.S. Patent Application Publication No. 2011/0164334 A1 discloses MgO and $MgF_2$, in addition to alumina and $SiO_2$, as materials usable for the cladding. However, since MgO is higher in refractive index than alumina and $SiO_2$, using MgO as the material of the cladding to directly contact the core will make the wave guide efficiency of the waveguide lower than in the case of using alumina or $SiO_2$ as the material of the cladding.

On the other hand, MgF$_2$ is a material that has a very low thermal conductivity. Thus, if MgF$_2$ is in contact with the plasmon generator, dissipation of heat generated in the plasmon generator will be inhibited to cause a rise in temperature of the plasmon generator.

It has thus been conventionally difficult to prevent the plasmon generator from being deformed due to a rise in temperature thereof, without degrading in the wave guide efficiency of the waveguide.

OBJECT AND SUMMARY OF THE INVENTION

It is a first object of the present invention to provide a near-field light generator that includes a plasmon generator and a waveguide and is capable of preventing the plasmon generator from being deformed due to a rise in temperature of the plasmon generator, without degrading the wave guide efficiency of the waveguide.

It is a second object of the present invention to provide a thermally-assisted magnetic recording head, a head gimbal assembly and a magnetic recording device each of which includes the aforementioned near-field light generator.

A near-field light generator of the present invention includes a waveguide, a plasmon generator, and an MgO layer. The waveguide includes a core through which light propagates, and a cladding. The plasmon generator has an outer surface including a plasmon exciting part and a near-field light generating part. The plasmon generator is configured so that a surface plasmon is excited on the plasmon exciting part based on the light propagating through the core, and the near-field light generating part generates near-field light based on the surface plasmon. The MgO layer is in contact with at least part of the outer surface of the plasmon generator excluding the near-field light generating part, and not in contact with the core. The cladding is lower in refractive index than the core and the MgO layer.

A thermally-assisted magnetic recording head of the present invention includes a medium facing surface that faces a magnetic recording medium, a magnetic pole, the aforementioned waveguide, the aforementioned plasmon generator, and the aforementioned MgO layer. The magnetic pole has an end face located in the medium facing surface, and produces a write magnetic field for writing data on the magnetic recording medium.

In the near-field light generator and the thermally-assisted magnetic recording head of the present invention, the cladding may have an interposition part interposed between the core and the plasmon generator. In this case, the core may have an evanescent light generating surface that generates evanescent light based on the light propagating through the core, and the plasmon exciting part may be opposed to the evanescent light generating surface with the interposition part interposed therebetween. In this case, the surface plasmon is excited on the plasmon exciting part through coupling with the evanescent light generated by the evanescent light generating surface. Further, at least part of the MgO layer may be interposed between the interposition part and the plasmon generator.

A head gimbal assembly of the present invention includes the thermally-assisted magnetic recording head of the present invention, and a suspension that supports the thermally-assisted magnetic recording head. A magnetic recording device of the present invention includes a magnetic recording medium, the thermally-assisted magnetic recording head of the present invention, and a positioning device that supports the thermally-assisted magnetic recording head and positions the same with respect to the magnetic recording medium.

In the present invention, the MgO layer is in contact with at least part of the outer surface of the plasmon generator excluding the near-field light generating part, and not in contact with the core. Further, the cladding is lower in refractive index than the core and the MgO layer. Consequently, according to the present invention, it is possible to prevent the plasmon generator from being deformed due to a rise in temperature thereof, without degrading the wave guide efficiency of the waveguide.

Other and further objects, features and advantages of the present invention will appear more fully from the following description.

BRIEF DESCRIPTION OF THE DRAWINGS

FIG. 9A and FIG. 9B each show an image of part of a surface of a sample of a comparative example used in a first experiment, which was obtained by photographing under an AFM.

FIG. 10A and FIG. 10B each show an image of part of a surface of a sample of a practical example used in the first experiment, which was obtained by photographing under an AFM.

FIG. 22 is a front view showing the main part of a thermally-assisted magnetic recording head according to an eighth embodiment of the invention.

DETAILED DESCRIPTION OF THE PREFERRED EMBODIMENTS

First Embodiment

Figure 5:
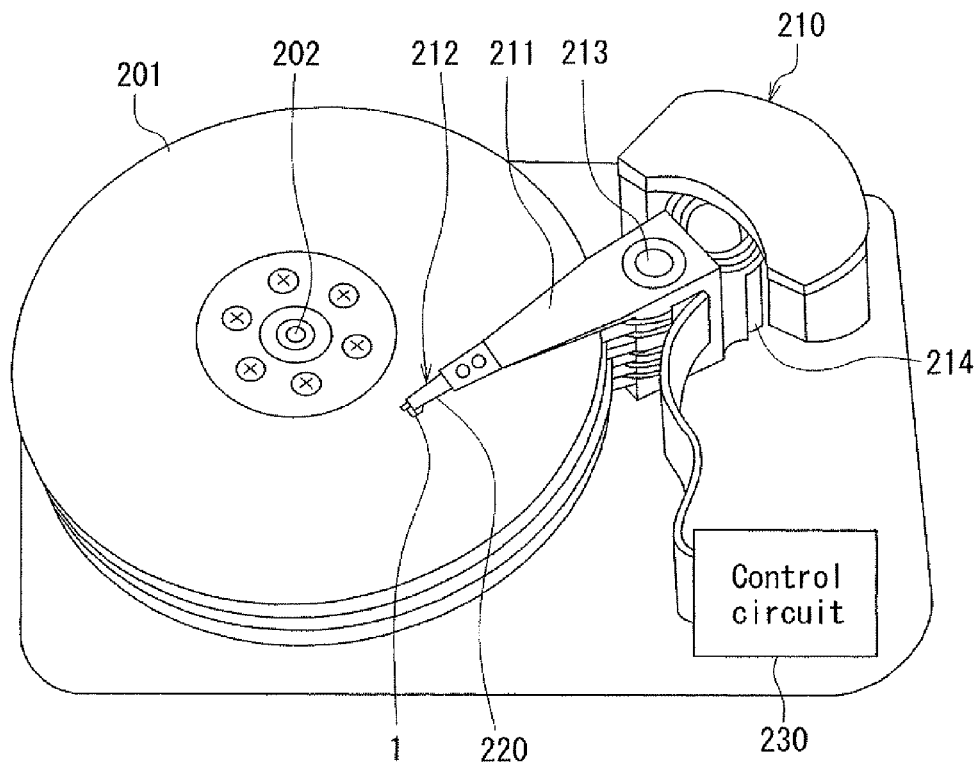
FIG. 5 is a perspective view showing a magnetic recording device according to the first embodiment of the invention.

Preferred embodiments of the present invention will now be described in detail with reference to the drawings. First, reference is made to FIG. 5 to describe a magnetic disk drive that functions as a magnetic recording device according to a first embodiment of the invention. As shown in FIG. 5, the magnetic disk drive includes a plurality of magnetic disks 201 serving as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic under layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning the thermally-assisted magnetic recording heads 1 on tracks which are concentrically formed in the magnetic recording layer of each magnetic disk 201. The tracks are the area of the magnetic recording layer on which data is to be written. Each track is provided with a plurality of record bits formed in a row. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 6:
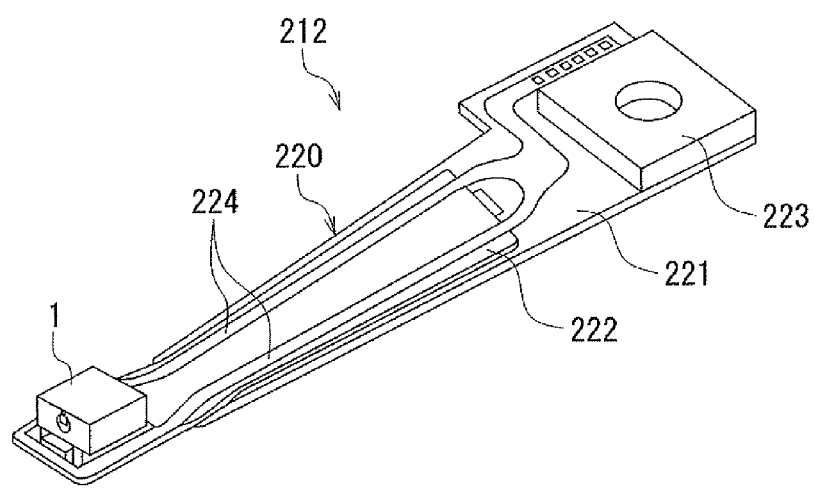
FIG. 6 is a perspective view showing a head gimbal assembly according to the first embodiment of the invention.

FIG. 6 is a perspective view showing the head gimbal assembly 212 of FIG. 5. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 6. For example, the head gimbal assembly of the present invention may have an IC chip for driving the head that is mounted somewhere along the suspension 220.

Figure 7:
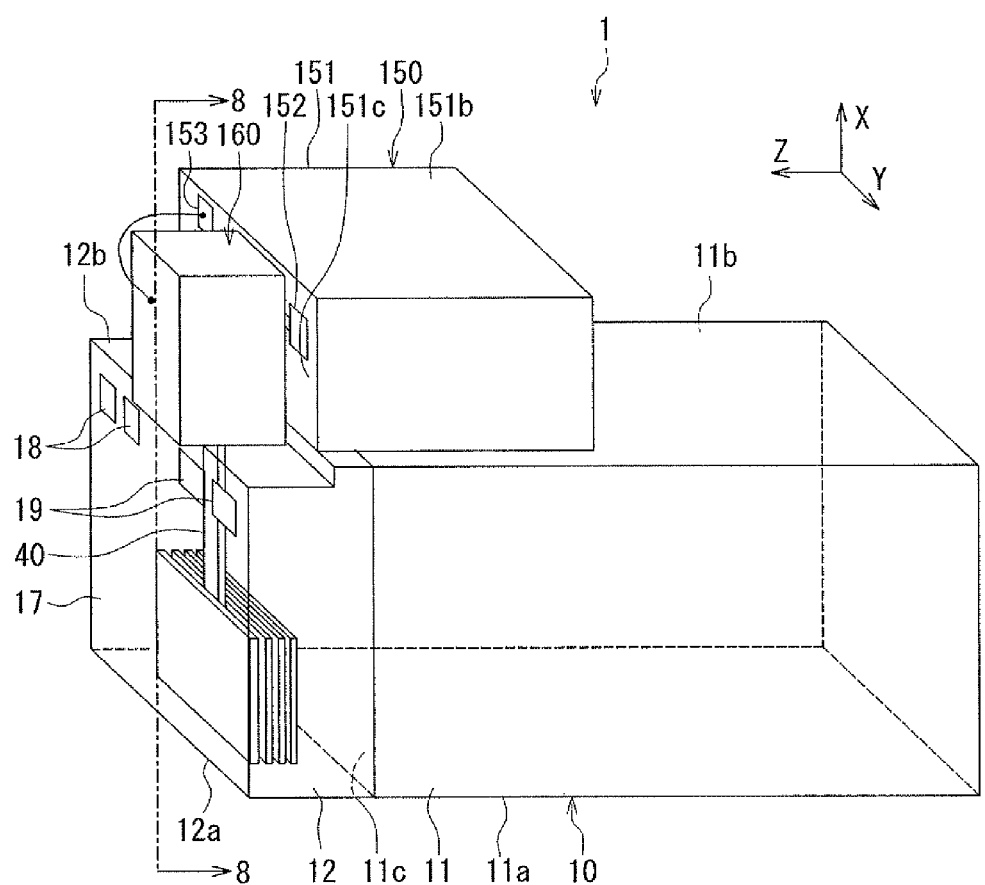
FIG. 7 is a perspective view showing the thermally-assisted magnetic recording head according to the first embodiment of the invention.
Figure 8:
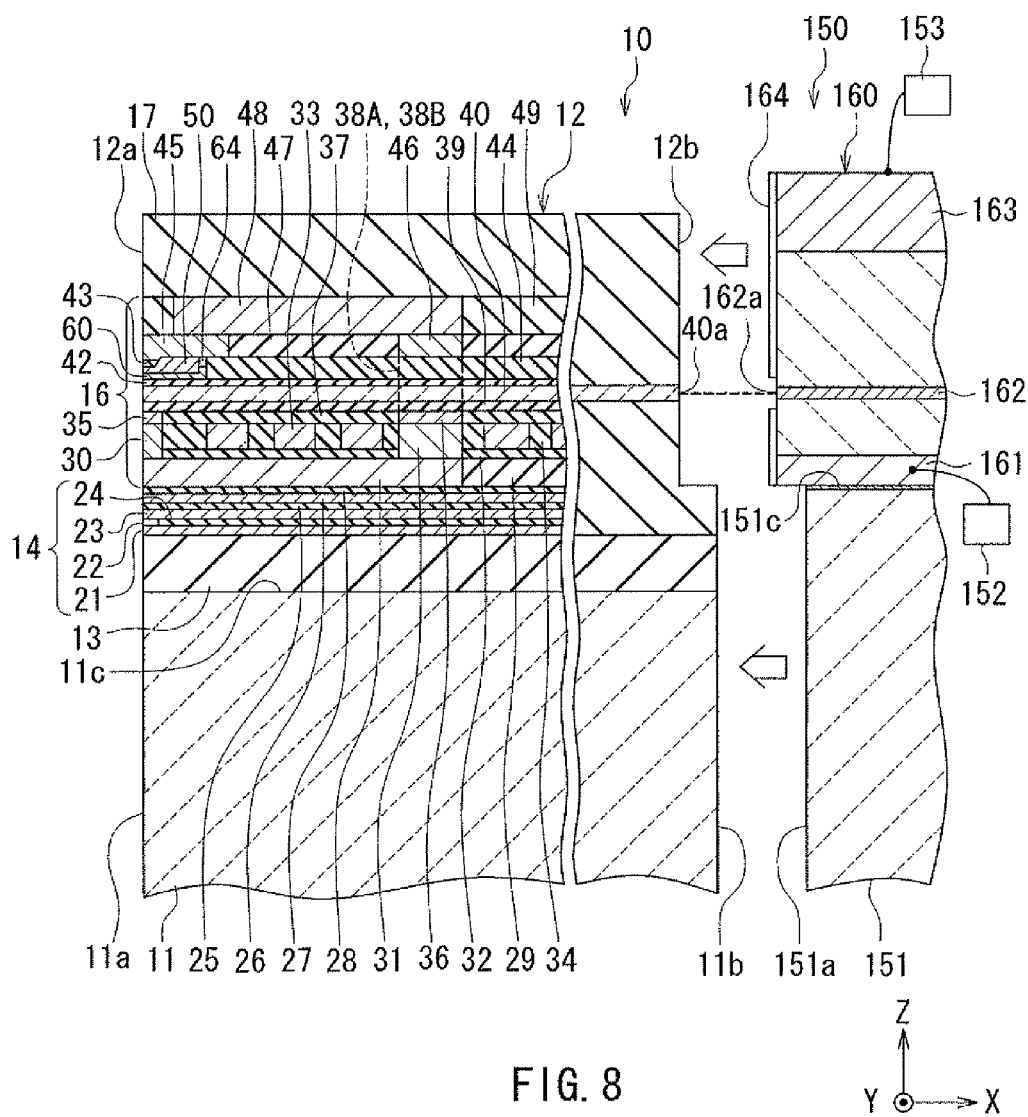
FIG. 8 shows a cross section taken along line 8-8 of FIG. 7.

The configuration of the thermally-assisted magnetic recording head 1 according to the present embodiment will now be described with reference to FIG. 7 and FIG. 8. FIG. 7 is a perspective view showing the thermally-assisted magnetic recording head 1. FIG. 8 shows a cross section taken along line 8-8 of FIG. 7. The thermally-assisted magnetic recording head 1 includes a slider 10 and a light source unit 150. FIG. 8 shows a state where the slider 10 and the light source unit 150 are separated from each other.

The slider 10 includes a slider substrate 11 and a head section 12. The slider substrate 11 is in the shape of a rectangular solid and is formed of a ceramic material such as aluminum oxide-titanium carbide ($Al_2O_3$—TiC). The slider substrate 11 has a medium facing surface 11a facing the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head section 12 is disposed on the element-forming surface 11c. The medium facing surface 11a is processed so as to obtain an appropriate flying height of the slider 10 from the magnetic disk 201. The head section 12 has a medium facing surface 12a facing the magnetic disk 201, and a rear surface 12b opposite to the medium facing surface 12a. The medium facing surface 12a is parallel to the medium facing surface 11a of the slider substrate 11.

Where the components of the head section 12 are concerned, with respect to a reference position, a position located in the direction that extends perpendicular to the element-forming surface 11c and away from the element-forming surface 11c is defined as "above", and a position located in the direction opposite to the aforementioned direction is defined as "below". Where the layers included in the head section 12 are concerned, the surface closer to the element-forming surface 11c is defined as a "bottom surface," and the surface farther from the element-forming surface 11c is defined as a "top surface."

Moreover, X direction, Y direction, Z direction, −X direction, −Y direction, and −Z direction will be defined as follows. The X direction is the direction perpendicular to the medium facing surface 11a and from the medium facing surface 11a to the rear surface 11b. The Y direction is the direction parallel to the medium facing surface 11a and the element-forming surface 11c and from the back side to the front side of FIG. 8. The Z direction is the direction extending perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is parallel to the Y direction.

The light source unit 150 includes a laser diode 160 serving as a light source for emitting laser light, and a support member 151 that is in the shape of a rectangular solid and supports the laser diode 160. The support member 151 is formed of, for example, a ceramic material such as aluminum oxide-titanium carbide ($Al_2O_3$—TiC). The support member 151 has a bond surface 151a, a rear surface 151b opposite to the bond surface 151a, and four surfaces connecting the bond surface 151a to the rear surface 151b. One of the four surfaces connecting the bond surface 151a to the rear surface 151b is a light source mount surface 151c. The bond surface 151a is the surface to be bonded to the rear surface 11b of the slider substrate 11. The light source mount surface 151c is perpendicular to the bond surface 151a and parallel to the element-forming surface 11c. The laser diode 160 is mounted on the light source mount surface 151c. The support member 151 may function as a heat sink for dissipating heat generated by the laser diode 160, as well as serving to support the laser diode 160.

As shown in FIG. 8, the head section 12 includes an insulating layer 13 disposed on the element-forming surface 11c, and also includes a read head section 14, a write head section 16 and a protective layer 17 that are stacked in this order on the insulating layer 13. The insulating layer 13 and the protective layer 17 are each formed of an insulating material such as $Al_2O_3$ (hereinafter, also referred to as alumina).

The read head section 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 and surrounding the MR element 22. The bottom shield layer 21 and the top shield layer 23 are each formed of a soft magnetic material. The insulating layer 24 is formed of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the planes of layers constituting the GMR element or the current-perpendicular-to-plane (CPP) type in which the sense current is fed in a direction generally perpendicular to the planes of layers constituting the GMR element. If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head section 12 further includes an insulating layer 25 disposed on the top shield layer 23, a middle shield layer 26 disposed on the insulating layer 25, and an insulating layer 27 disposed on the middle shield layer 26. The middle shield layer 26 has the function of shielding the MR element 22 from a magnetic field produced in the write head section 16. The insulating layers 25 and 27 are each formed of an insulating material such as alumina. The middle shield layer 26 is formed of a soft magnetic material. The insulating layer 25 and the middle shield layer 26 may be omitted.

The write head section 16 is for use in perpendicular magnetic recording. The write head section 16 includes a return yoke layer 28 disposed on the insulating layer 27, and an insulating layer 29 disposed on the insulating layer 27 and surrounding the return yoke layer 28. The return yoke layer 28 is formed of a soft magnetic material. The return yoke layer 28 has an end face located in the medium facing surface 12a. The top surfaces of the return yoke layer 28 and the insulating layer 29 are even with each other.

The write head section 16 further includes a coupling layer 30 disposed near the medium facing surface 12a and lying on the return yoke layer 28, and a coupling layer 31 disposed away from the medium facing surface 12a and lying on the return yoke layer 28. The coupling layers 30 and 31 are each formed of a soft magnetic material. The coupling layer 30 has an end face located in the medium facing surface 12a.

The write head section 16 further includes an insulating layer 32 lying on the return yoke layer 28 and the insulating layer 29 and surrounding the coupling layers 30 and 31, and a coil 33 disposed on the insulating layer 32. The coil 33 is planar spiral-shaped and wound around the coupling layer 31. The coil 33 produces a magnetic field corresponding to data to be written on the magnetic disk 201. The coil 33 is formed of a conductive material such as copper.

The write head section 16 further includes: an insulating layer 34 disposed around the coupling layers 30 and 31 and the coil 33 and in the space between adjacent turns of the coil 33; a shield layer 35 disposed on the coupling layer 30; a coupling layer 36 disposed on the coupling layer 31; and an insulating layer 37 disposed on the coil 33 and the insulating layer 34 and surrounding the shield layer 35 and the coupling layer 36. The shield layer 35 and the coupling layer 36 are each formed of a soft magnetic material. The shield layer 35 has an end face located in the medium facing surface 12a. The top surfaces of the shield layer 35, the coupling layer 36 and the insulating layer 37 are even with each other.

The write head section 16 further includes two coupling portions 38A and 38B disposed on the coupling layer 36. The coupling portions 38A and 38B are formed of a soft magnetic material. The coupling portions 38A and 38B are aligned in the track width direction TW.

Figure 2:
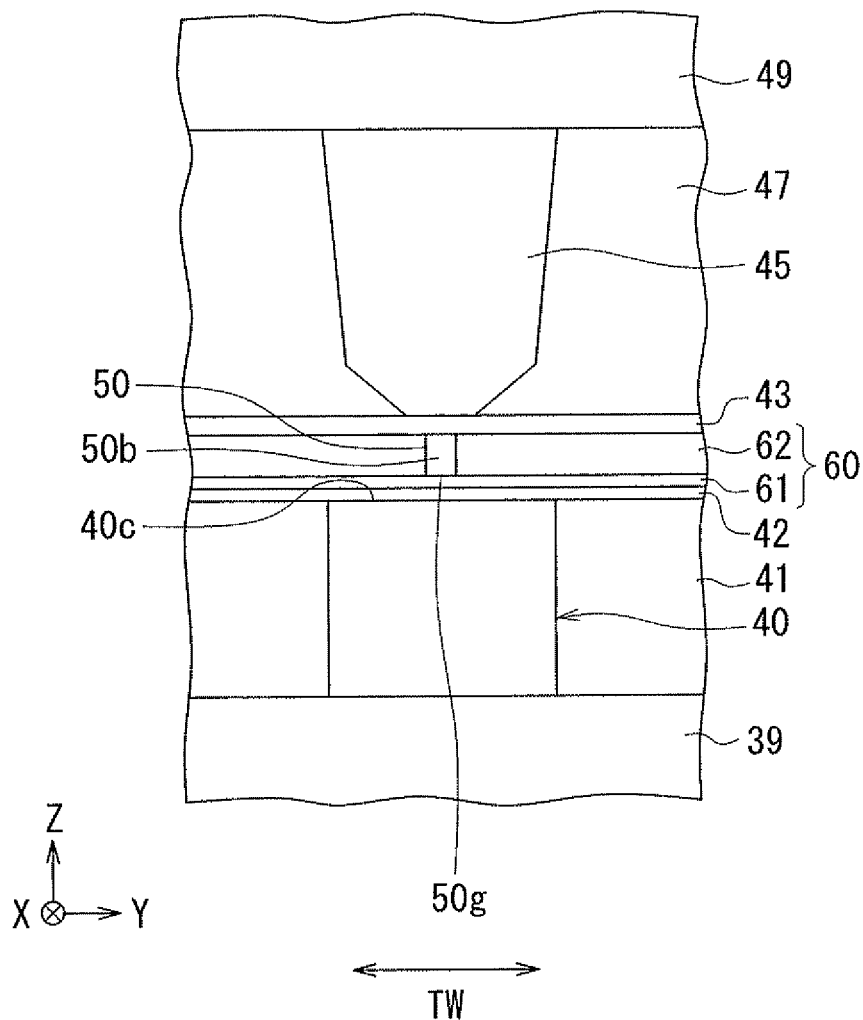
FIG. 2 is a front view showing the main part of the thermally-assisted magnetic recording head according to the first embodiment of the invention.

The write head section 16 further includes a waveguide including a core 40 and a cladding. The cladding includes cladding layers 39, 41 and 42. The cladding layer 39 lies on the shield layer 35, the coupling layer 36 and the insulating layer 37. The core 40 lies on the cladding layer 39. The cladding layer 41 lies on the cladding layer 39 and surrounds the core 40. The cladding layer 41 is not shown in FIG. 8 but is shown in FIG. 2, which will be described later. The cladding layer 42 lies on the core 40 and the cladding layer 41.

The core 40 extends in the direction perpendicular to the medium facing surface 12a (the X direction). The core 40 has an incidence end 40a, and a front end face opposite thereto. The core 40 allows laser light that is emitted from the laser diode 160 and incident on the incidence end 40a to propagate through.

The core 40 is formed of a dielectric material that transmits the laser light. Each of the cladding layers 39, 41 and 42 is formed of a dielectric material and has a refractive index lower than that of the core 40. For example, if the core 40 is formed of $Al_2O_3$ (refractive index n=1.69), the cladding layers 39, 41 and 42 may be formed of $SiO_2$ (n=1.45). If the core 40 is formed of tantalum oxide such as $Ta_2O_5$ (n=2.05), the cladding layers 39, 41 and 42 may be formed of $SiO_2$ or $Al_2O_3$.

Parts of the coupling portions 38A and 38B are embedded in the cladding layers 39, 41 and 42. The coupling portions 38A and 38B are located on opposite sides of the core 40 in the track width direction TW and are each spaced from the core 40.

The write head section 16 further includes a plasmon generator 50 disposed above the core 40 in the vicinity of the medium facing surface 12a, and an MgO layer 60 formed of MgO. In the present embodiment, the MgO layer 60 is located on the cladding layer 42, being in contact with part of the outer surface of the plasmon generator 50 and not in contact with the core 40.

The plasmon generator 50 is preferably formed of a material that has a low dielectric loss. Examples of such a material include one metal selected from the group consisting of Au, Ag, Cu and Al, and an alloy containing at least one of these metals. Further, the plasmon generator 50 may be composed of a plurality of layers of different metals.

At least part of the plasmon generator 50 may be formed of Au or Ag, or an alloy composed predominantly of Au or Ag. The alloy composed predominantly of Au or Ag may contain, for example, at least one element selected from the group consisting of Co, Fe, Sb, Nb, Pd, Cu, Nd, and Bi in an amount greater than or equal to 0.2 atomic percent and smaller than or equal to 2.0 atomic percent. Such an alloy is higher in mechanical strength and heat resistance than Au and Ag. Thus, using such an alloy to form at least part of the plasmon generator 50 allows the plasmon generator 50 to be prevented from being deformed due to a rise in temperature thereof.

A near-field light generator according to the present embodiment includes the waveguide, the plasmon generator 50, and the MgO layer 60. The shapes and locations of the core 40 of the waveguide, the plasmon generator 50 and the MgO layer 60 will be described in detail later.

The write head section 16 further includes: an insulating layer 43 located near the medium facing surface 12a and lying on the plasmon generator 50 and the MgO layer 60; a dielectric layer 64 located away from the medium facing surface 12a and lying on the MgO layer 60; and an insulating layer 44 lying on the cladding layer 42 and surrounding the insulating layer 43, the MgO layer 60 and the dielectric layer 64. The remainder of the coupling portions 38A and 38B are embedded in the insulating layer 44. The insulating layer 43 is formed of a nonmagnetic insulating material such as alumina. The dielectric layer 64 is in contact with part of the outer surface of the plasmon generator 50. For example, alumina or MgO is used as the material of the dielectric layer 64. The shape and location of the dielectric layer 64 will be described in detail later.

The write head section 16 further includes: a magnetic pole 45 disposed such that the plasmon generator 50 is interposed between the magnetic pole 45 and the core 40; a coupling layer 46 lying on the coupling portions 38A and 38B and the insulating layer 44; and an insulating layer 47 disposed around the magnetic pole 45 and the coupling layer 46. In the present embodiment, the magnetic pole 45 lies on the plasmon generator 50, the dielectric layer 64 and the insulating layer 44. The coupling layer 46 is formed of a soft magnetic material. The top surfaces of the magnetic pole 45, the coupling layer 46 and the insulating layer 47 are even with each other. The shape and location of the magnetic pole 45 will be described in detail later.

The write head section 16 further includes a yoke layer 48 and an insulating layer 49. The yoke layer 48 lies on the magnetic pole 45, the insulating layer 47 and the coupling layer 46. A part of the yoke layer 48 located near the medium facing surface 12a is in contact with the top surface of the magnetic pole 45, and another part of the yoke layer 48 located away from the medium facing surface 12a is in contact with the top surface of the coupling layer 46. The yoke layer 48 is formed of a soft magnetic material. The insulating layer 49 surrounds the yoke layer 48. The top surfaces of the yoke layer 48 and the insulating layer 49 are even with each other.

In the write head section 16, a magnetic path for passing a magnetic flux corresponding to the magnetic field produced by the coil 33 is formed by the shield layer 35, the coupling layer 30, the return yoke layer 28, the coupling layers 31 and 36, the coupling portions 38A and 38B, the coupling layer 46, the yoke layer 48, and the magnetic pole 45. The magnetic pole 45 has an end face located in the medium facing surface 12a. The magnetic pole 45 allows the magnetic flux corresponding to the magnetic field produced by the coil 33 to pass, and produces a write magnetic field for writing data on the magnetic disk 201.

As shown in FIG. 8, the protective layer 17 is disposed to cover the write head section 16. As shown in FIG. 7, the head section 12 further includes a pair of terminals 18 that are disposed on the top surface of the protective layer 17 and electrically connected to the MR element 22, and a pair of terminals 19 that are disposed on the top surface of the protective layer 17 and electrically connected to the coil 33. These terminals 18 and 19 are electrically connected to the plurality of pad-shaped terminals of the wiring member 224 shown in FIG. 6.

The laser diode 160 may be a laser diode of InP type, GaAs type, GaN type or the like that is commonly used for such applications as communications, optical disc storage and material analysis. The laser diode 160 may emit laser light of any wavelength within the range of, for example, 375 nm to 1.7 µm. Specifically, the laser diode 160 may be an InGaAsP/InP quarternary mixed crystal laser diode having an emittable wavelength range of 1.2 to 1.67 µm, for example.

As shown in FIG. 8, the laser diode 160 has a multilayer structure including a lower electrode 161, an active layer 162, and an upper electrode 163. A reflecting layer 164 of $SiO_2$ or $Al_2O_3$, for example, is formed on two cleavage planes of the multilayer structure so as to excite oscillation by total reflection of light. The reflecting layer 164 has an opening for emitting laser light in the position of the active layer 162 including an emission center 162a.

The light source unit 150 further includes a terminal 152 disposed on the light source mount surface 151c and electrically connected to the lower electrode 161, and a terminal 153 disposed on the light source mount surface 151c and electrically connected to the upper electrode 163. These terminals 152 and 153 are electrically connected to the plurality of pad-shaped terminals of the wiring member 224 shown in FIG. 6. When a predetermined voltage is applied to the laser diode 160 through the terminals 152 and 153, laser light is emitted from the emission center 162a of the laser diode 160.

The laser light emitted from the laser diode 160 is preferably TM-mode polarized light whose electric field oscillates in a direction perpendicular to the plane of the active layer 162.

The laser diode 160 can be driven by a power supply inside the magnetic disk drive. The magnetic disk drive usually includes a power supply that generates a voltage of 5 V or so, for example. This supply voltage is sufficient to drive the laser diode 160. The laser diode 160 has a power consumption of, for example, several tens of milliwatts or so, which can be adequately covered by the power supply in the magnetic disk drive.

The light source unit 150 is secured to the slider 10 by bonding the bond surface 151a of the support member 151 to the rear surface 11b of the slider substrate 11, as shown in FIG. 8. The laser diode 160 and the core 40 are positioned with respect to each other so that the laser light emitted from the laser diode 160 will be incident on the incidence end 40a of the core 40.

Figure 1:
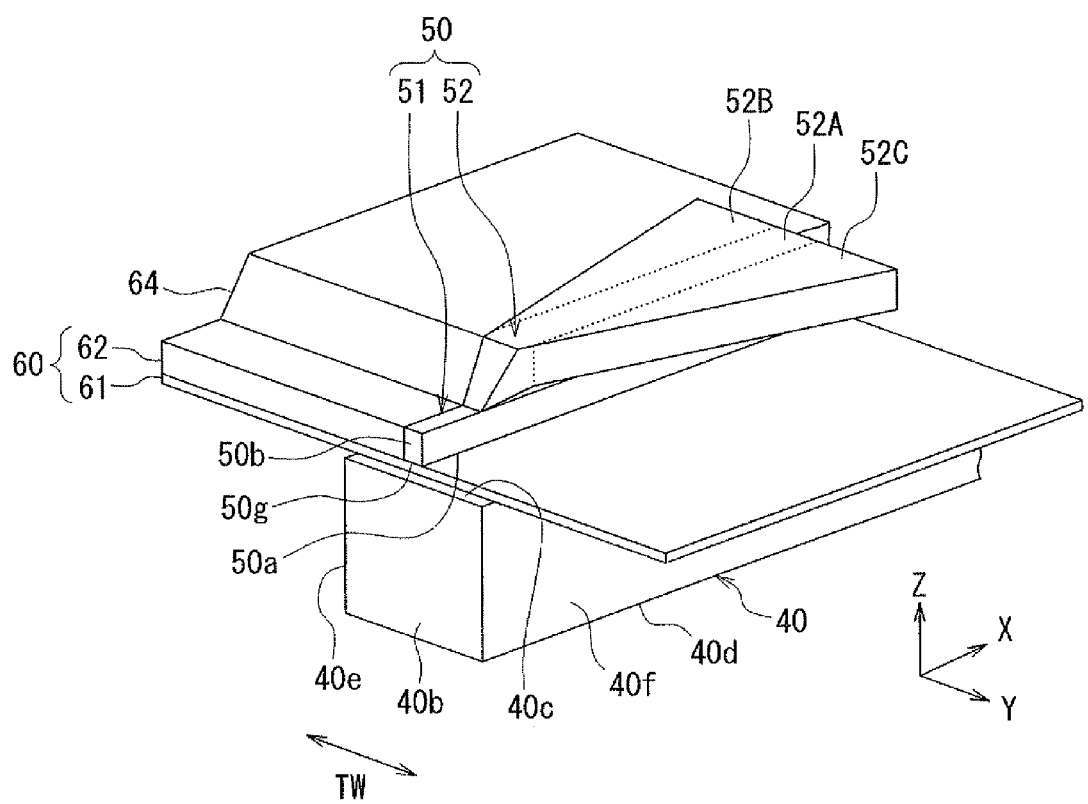
FIG. 1 is a perspective view showing the main part of a thermally-assisted magnetic recording head according to a first embodiment of the invention.
Figure 3:
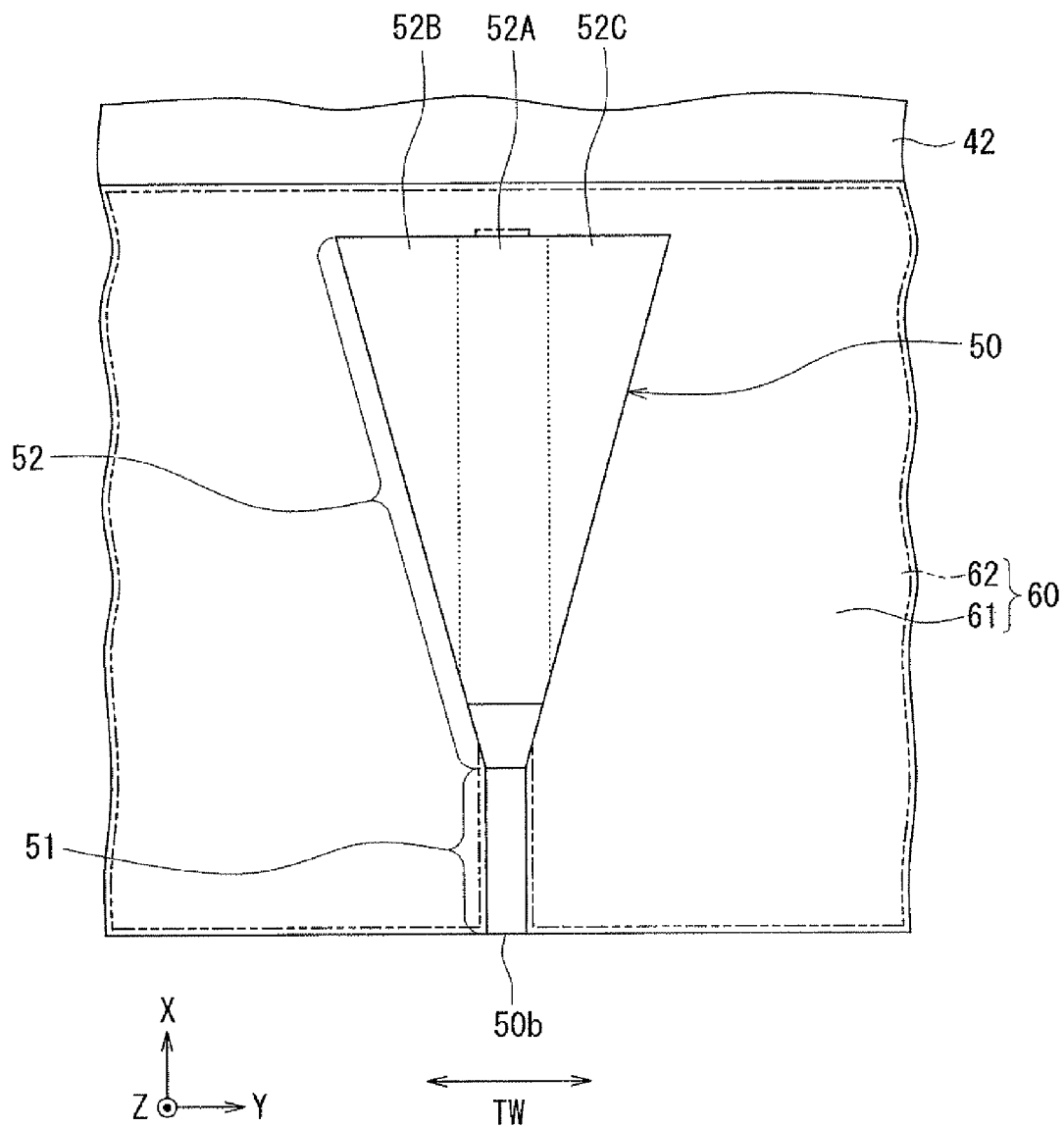
FIG. 3 is a plan view showing the main part of the thermally-assisted magnetic recording head according to the first embodiment of the invention.
Figure 4:
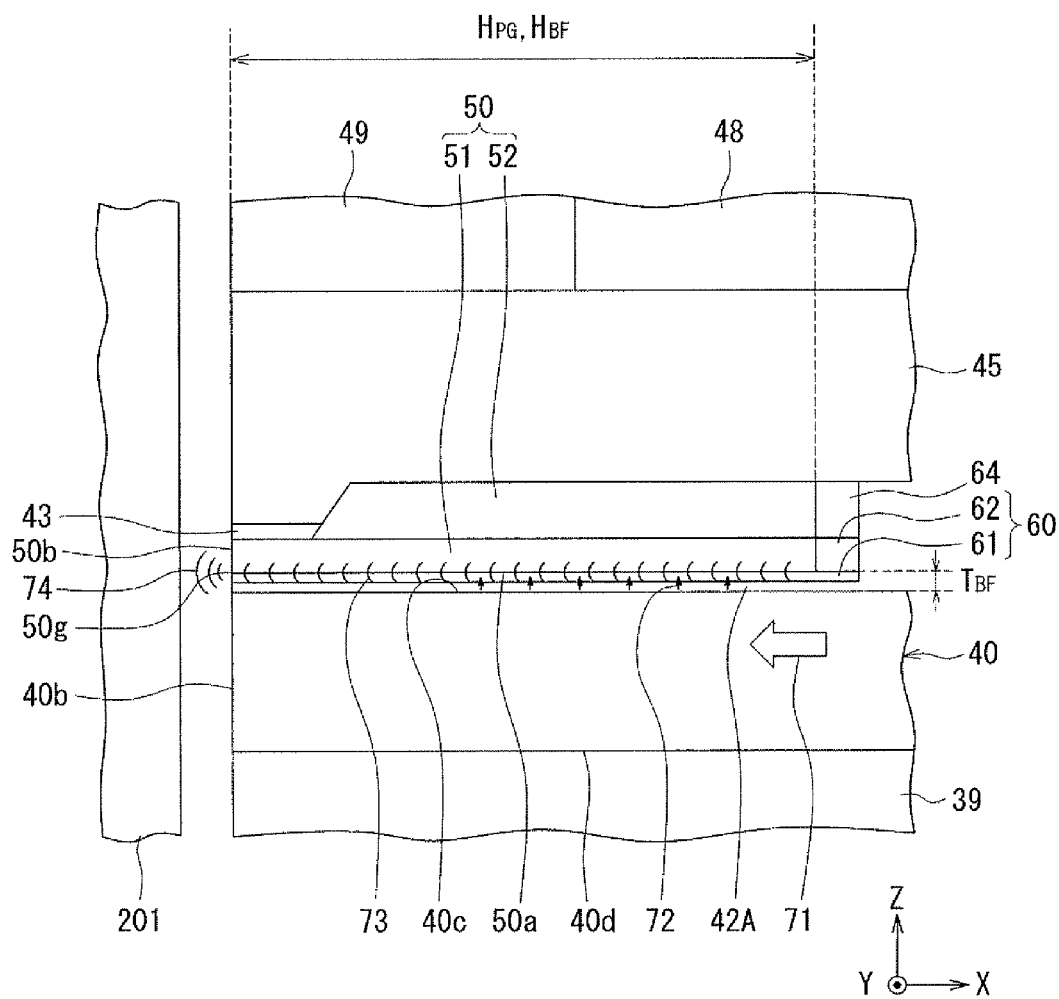
FIG. 4 is a cross-sectional view showing the main part of the thermally-assisted magnetic recording head according to the first embodiment of the invention.

The core 40, the plasmon generator 50, the MgO layer 60, the dielectric layer 64, and the magnetic pole 45 will now be described in detail with reference to FIG. 1 to FIG. 4. FIG. 1 is a perspective view showing the main part of the thermally-assisted magnetic recording head 1. FIG. 2 is a front view showing the main part of the thermally-assisted magnetic recording head 1. FIG. 3 is a plan view showing the main part of the thermally-assisted magnetic recording head 1. FIG. 4 is a cross-sectional view showing the main part of the thermally-assisted magnetic recording head 1. FIG. 4 shows a cross section perpendicular to the element-forming surface 11c (see FIG. 8) and to the medium facing surface 12a.

The core 40 will be described first. The core 40 has the incidence end 40a shown in FIG. 8 and further has: a front end face 40b which is closer to the medium facing surface 12a; an evanescent light generating surface 40c which is a top surface; a bottom surface 40d; and two side surfaces 40e and 40f. FIG. 1, FIG. 2 and FIG. 4 show an example in which the front end face 40b is located in the medium facing surface 12a; however, the front end face 40b may be located at a distance from the medium facing surface 12a. The evanescent light generating surface 40c generates evanescent light based on the light propagating through the core 40. The evanescent light generating surface 40c is perpendicular to the Z direction. The core 40 is located on the rear side in the direction of travel of the magnetic disk 201 relative to the plasmon generator 50 and the MgO layer 60. The cladding layer 42 includes an interposition part 42A (see FIG. 4) interposed between the core 40 and the plasmon generator 50. Since the cladding layer 42 is part of the cladding, the cladding can be said to include the interposition part 42A.

Next, the plasmon generator 50 will be described. As shown in FIG. 1 to FIG. 4, the plasmon generator 50 has an outer surface that includes a plasmon exciting part 50a and a front end face 50b. The plasmon exciting part 50a is opposed to the evanescent light generating surface 40c of the core 40 with a predetermined spacing therebetween. The front end face 50b is located in the medium facing surface 12a. Surface plasmons are excited on the plasmon exciting part 50a through coupling with the evanescent light generated by the evanescent light generating surface 40c. The front end face 50b includes a near-field light generating part 50g. To be specific, the near-field light generating part 50g is an end of the front end face 50b intersecting the plasmon exciting part 50a, or refers to this end and a portion in the neighborhood thereof. The near-field light generating part 50g generates near-field light based on the surface plasmons excited on the plasmon exciting part 50a.

Further, as shown in FIG. 1, FIG. 3 and FIG. 4, the plasmon generator 50 includes a first portion 51 and a second portion 52. The first portion 51 extends in the direction perpendicular to the medium facing surface 12a (the X direction). The first portion 51 has a front end face located in the medium facing surface 12a, a top surface, a bottom surface, first and second side surfaces, and a rear end face. The front end face of the first portion 51 also serves as the front end face 50b of the plasmon generator 50. The bottom surface of the first portion 51 also serves as the plasmon exciting part 50a of the plasmon generator 50. The width of the first portion 51 in the track width direction TW is generally constant regardless of the distance from the medium facing surface 12a. For example, the first portion 51 is rectangular in cross section parallel to the medium facing surface 12a.

The second portion 52 includes a main body 52A, and two extended portions 52B and 52C coupled to the main body 52A. The main body 52A is located away from the medium facing surface 12a, lies on a side of the first portion 51 opposite from the plasmon exciting part 50a, and is coupled to the first portion 51. In FIG. 1 and FIG. 3, the boundaries between the main body 52A and the extended portions 52B and 52C are shown by dotted lines.

The main body 52A has a front end face facing toward the medium facing surface 12a, a top surface, first and second sides, and a rear end face. The front end face of the main body 52A is located at a distance from the medium facing surface 12a. The distance from the medium facing surface 12a to an arbitrary point on the front end face of the main body 52A increases with increasing distance from the arbitrary point to the element-forming surface 11c. The width of the top surface of the main body 52A in the track width direction TW is generally constant regardless of the distance from the medium facing surface 12a.

The extended portion 52B extends from the first side of the main body 52A in a direction parallel to the evanescent light generating surface 40c and away from the main body 52A (the −Y direction). The extended portion 52C extends from the second side of the main body 52A in a direction parallel to the evanescent light generating surface 40c and away from the main body 52A (the Y direction). Each of the extended portions 52B and 52C has a top surface, a bottom surface, a side surface, and a rear end face. The width of each of the extended portions 52B and 52C in the track width direction TW increases with increasing distance from the medium facing surface 12a.

As shown in FIG. 4, the length of the plasmon generator 50 in the X direction will be represented by the symbol $H_{PG}$. $H_{PG}$ falls within the range of 0.6 to 4.0 µm, for example. The length of a portion of the plasmon exciting part 50a in the X direction, the portion being opposed to the evanescent light generating surface 40c, will be represented by the symbol $H_{BF}$. The distance between the plasmon exciting part 50a and the evanescent light generating surface 40c will be represented by the symbol $T_{BF}$. Both $H_{BF}$ and $T_{BF}$ are important parameters in achieving appropriate excitation and propagation of surface plasmons. $H_{BF}$ falls within the range of 0.6 to 4.0 µm, for example. In the example shown in FIG. 4, $H_{BF}$ is equal to $H_{PG}$ since the front end face 40b of the core 40 is located in the medium facing surface 12a. $T_{BF}$ falls within the range of 10 to 100 nm, for example. The distance between the near-field light generating part 50g in the front end face 50b of the plasmon generator 50 and the front end face 40b of the core 40 is equal to $T_{BF}$.

The MgO layer 60 will now be described. As shown in FIGS. 1 and 2, the MgO layer 60 includes a first layer 61 located on the cladding layer 42 and a second layer 62 located on the first layer 61. The first layer 61 is plate-shaped. Part of the first layer 61 is interposed between the interposition part 42A and the plasmon generator 50. In FIG. 3 the second layer 62 is shown in a chain double-dashed line. The first layer 61 is in contact with the plasmon exciting part 50a or the bottom surface of the first portion 51 of the plasmon generator 50. The second layer 62 lies on opposite sides of the first portion 51 in the track width direction TW and on a side of the first portion 51 opposite from the medium facing surface 12a, being in contact with the first side surface, the second side surface and the rear end face of the first portion 51. Thus, the MgO layer 60 is in contact with part of the outer surface of the plasmon generator 50 excluding the near-field light generating part 50g.

Note that FIG. 1 does not show one of two portions of the second layer 62 that are located on opposite sides of the first portion 51 in the track width direction TW. Further, for ease of understanding, in FIG. 3 the second layer 62 and the first portion 51 are depicted as being separated from each other. Any views similar to FIG. 3, to be referred to for descriptions below, will also employ the same way of representation as in FIG. 3.

In the present embodiment, as shown in FIG. 3 and FIG. 4, the length of the first layer 61 in the X direction is greater than the length $H_{PG}$ of the plasmon generator 50. As shown in FIG. 3, the width of the first layer 61 in the track width direction TW is greater than the maximum dimension of the plasmon generator 50 (the maximum dimension of the second portion 52) in the same direction. The length of the second layer 62 in the X direction is equal to the length of the first layer 61 in the X direction, and is thus greater than the length $H_{PG}$ of the plasmon generator 50. Further, the dimension of the second layer 62 in the track width direction TW is greater than the maximum dimension of the plasmon generator 50 in the same direction.

Next, the dielectric layer 64 will be described. As shown in FIG. 1, the dielectric layer 64 is located on the second layer 62 of the MgO layer 60. The dielectric layer 64 lies on opposite sides of the second portion 52 in the track width direction TW and on a side of the second portion 52 opposite from the medium facing surface 12a, being in contact with part of the first side, part of the second side, and the rear end face of the main body 52A of the second portion 52, and with the bottom surface, the side surface and the rear end face of each of the extended portions 52B and 52C. Note that FIG. 1 does not show one of two portions of the dielectric layer 64 that are located on opposite sides of the second portion 52 in the track width direction TW.

The magnetic pole 45 will now be described. The magnetic pole 45 has a front end face located in the medium facing surface 12a, a rear end face, a top surface, a bottom surface, and two side surfaces. The bottom surface of the magnetic pole 45 includes a first portion, a second portion, and a third portion which are contiguously arranged in this order, the first portion being closest to the medium facing surface 12a. The first portion and the third portion of the bottom surface of the magnetic pole 45 are parallel to the element-forming surface 11c. The distance from the element-forming surface 11c to the third portion is greater than the distance from the element-forming surface 11c to the first portion. The distance from the element-forming surface 11c to an arbitrary point on the second portion of the bottom surface of the magnetic pole 45 increases with increasing distance from the arbitrary point to the medium facing surface 12a. The insulating layer 43 is interposed between the first portion of the bottom surface of the magnetic pole 45 and the top surface of the first portion 51 of the plasmon generator 50.

The two side surfaces of the magnetic pole 45 are inclined relative to the direction perpendicular to the element-forming surface 11c. The distance between the two side surfaces of the magnetic pole 45 increases with increasing distance from the plasmon generator 50.

The shapes and locations of the core 40, the plasmon generator 50, the MgO layer 60, the dielectric layer 64, and the magnetic pole 45 are not limited to the foregoing example which has been described with reference to FIG. 1 to FIG. 4.

Reference is now made to FIG. 4 to describe the principle of generation of near-field light in the present embodiment and the principle of thermally-assisted magnetic recording using the near-field light. Laser light 71 emitted from the laser diode 160 propagates through the core 40 of the waveguide to reach the vicinity of the plasmon generator 50. The plasmon generator 50 is configured so that surface plasmons are excited on the plasmon exciting part 50a based on the light propagating through the core 40 and the near-field light generating part 50g generates near-field light based on the surface plasmons. More specifically, in the core 40, the laser light 71 is totally reflected at the evanescent light generating surface 40c to cause evanescent light 72 to occur from the evanescent light generating surface 40c and permeate into the interposition part 42A. Then, surface plasmons 73 are excited on the plasmon exciting part 50a of the plasmon generator 50 through coupling with the evanescent light 72. The surface plasmons 73 propagate along the plasmon exciting part 50a to the near-field light generating part 50g. Consequently, the surface plasmons 73 concentrate at the near-field light generating part 50g, and the near-field light generating part 50g generates near-field light 74 based on the surface plasmons 73.

The near-field light 74 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 45 for data writing.

The functions and effects of the near-field light generator and the thermally-assisted magnetic recording head 1 according to the present embodiment will now be described. In the present embodiment, the MgO layer 60 is in contact with at least part of the outer surface of the plasmon generator 50 excluding the near-field light generating part 50g. Now, consider a case where the MgO layer 60 is not provided and in place of the MgO layer 60, the cladding is in contact with the plasmon generator 50. Au and Ag, each of which can be used as the material of the plasmon generator 50, has low adhesion to alumina and $SiO_2$, each of which can be used as the material of the cladding. Thus, in the aforementioned case, when the plasmon generator 50 is at an elevated temperature, growth or aggregation of crystal grains will occur due to internal strain, relaxation of surface energy, or stress migration caused by thermal stress, and this will cause the plasmon generator 50 to be susceptible to deformation.

To prevent this, the present embodiment provides the MgO layer 60 in contact with the plasmon generator 50. MgO is an ionic crystalline material, which is known as having higher adhesion to metal when compared with alumina and $SiO_2$. Thus, according to the present embodiment, it is possible to prevent deformation of the plasmon generator 50 better than in the case where the MgO layer 60 is not provided and in place of the MgO layer 60, alumina or $SiO_2$ is in contact with the plasmon generator 50. The results of experiments and simulations indicating this effect will be shown later.

Further, MgO is higher in thermal conductivity than alumina and SiO$_2$. The actually measured thermal conductivities of SiO$_2$, alumina, and MgO in the state of thin film were 1.3 W/m·K, 2.0 W/m·K, and 14.0 W/m·K, respectively. Thus, according to the present embodiment, the MgO layer 60 in contact with the plasmon generator 50 allows the heat generated in the plasmon generator 50 to be effectively dissipated out of the plasmon generator 50. The present embodiment thus makes it possible to prevent a rise in temperature of the plasmon generator 50.

Furthermore, MgO is closer to Au and Ag in linear thermal expansion coefficient than are alumina and SiO$_2$. Specifically, the linear thermal expansion coefficient of SiO$_2$ is $3.5\times10^{-6}$/K, that of alumina is $7.2\times10^{-6}$/K, that of MgO is $10\times10^{-6}$/K, that of Au is $14\times10^{-6}$/K, and that of Ag is $19\times10^{-6}$/K. Thus, according to the present embodiment, it is possible to reduce the thermal stress that is produced in the plasmon generator 50 due to differences in linear thermal expansion coefficient from surrounding materials. Consequently, the present embodiment makes it possible to prevent the plasmon generator 50 from being deformed. The results of simulations indicating this effect will be shown later.

MgO is higher in refractive index than alumina and SiO$_2$, each of which can be used as the material of the cladding. Thus, if the MgO layer 60 is in contact with the core 40, the wave guide efficiency of the waveguide will be degraded. In the present embodiment, since the MgO layer 60 is not in contact with the core 40, it is possible to prevent degradation of the wave guide efficiency of the waveguide. This is shown by the results of a first simulation described below.

The first simulation was performed to determine the relationship between the material of the cladding and the wave guide efficiency of the waveguide. Table 1 shows the results. The wave guide efficiency shown in Table 1 is the ratio of the power of laser light that arrives at the front end face 40$b$ of the core 40 to the power of laser light that is incident on the incidence end 40$a$ of the core 40 expressed on a percentage basis. The first simulation was performed assuming that the core 40 was formed of Ta$_2$O$_5$ (refractive index n=2.05).

TABLE 1

| Material of cladding | Refractive index n | Wave guide efficiency (%) |
| --- | --- | --- |
| SiO$_2$ | 1.45 | 20.7 |
| Al$_2$O$_3$ | 1.69 | 17.1 |
| MgO | 1.79 | 15.3 |

As shown in Table 1, when the material of the cladding is MgO, the wave guide efficiency of the waveguide is lower than when the material of the cladding is SiO$_2$ or alumina (Al$_2$O$_3$). This is because MgO has a refractive index closer to that of the core 40 when compared with SiO$_2$ and alumina. In the present embodiment, the MgO layer 60 is not in contact with the core 40, and the cladding which is in contact with the core 40 is lower in refractive index than the core 40 and the MgO layer 60. Thus, the present embodiment is free from degradation in the wave guide efficiency of the waveguide that would result from contact of the MgO layer 60 with the core 40.

As described above, in the present embodiment the MgO layer 60 is in contact with at least part of the outer surface of the plasmon generator 50 excluding the near-field light generating part 50$g$ and not in contact with the core 40, and the cladding is lower in refractive index than the core 40 and the MgO layer 60. According to the present embodiment, it is thus possible to prevent the plasmon generator 50 from being deformed due to a rise in temperature thereof, without degrading the wave guide efficiency of the waveguide.

Further, in the present embodiment, the MgO layer 60 is disposed around the first portion 51 of the plasmon generator 50 while the dielectric layer 64 is disposed around the second portion 52 of the plasmon generator 50. When the dielectric layer 64 is formed of MgO, the MgO layer 60 and the dielectric layer 64 correspond to the MgO layer of the present invention. In this case, the above-described effect of the present embodiment can be exerted more efficiently.

MgF$_2$, as well as alumina and SiO$_2$, can be used as the material of the cladding. It is thus conceivable to select MgF$_2$ as the material of the cladding and bring the cladding into contact with the plasmon generator 50. However, MgF$_2$ is much lower in thermal conductivity than MgO, alumina, and SiO$_2$. The actually measured thermal conductivity of MgF$_2$ in the state of thin film was 0.3 W/m·K. Thus, if MgF$_2$ is in contact with the plasmon generator 50, dissipation of heat generated in the plasmon generator 50 will be inhibited to cause a rise in temperature of the plasmon generator 50. The aforementioned structure is thus not preferable.

Now, the results of first and second experiments indicating the effects of the present embodiment will be described. To begin with, a description will be given of a sample of a comparative example and a sample of a practical example which were used in the first and second experiments. The sample of the comparative example was composed of an underlying layer of SiO$_2$ and an Au layer formed thereon. The sample of the practical example was composed of an underlying layer of MgO and an Au layer formed thereon. The Au layers were each formed by DC magnetron sputtering. The Au layers were each formed into a thickness of 50 nm. The Au layers each correspond to the plasmon generator 50 of the present embodiment. The underlying layer of the sample of the practical example corresponds to the MgO layer 60 of the present embodiment.

Now, the first experiment will be described. The first experiment was performed to examine the deformation of the Au layers at high temperatures. In this experiment, first, the respective surfaces of the sample of the comparative example and the sample of the practical example before heat treatment were observed under an atomic force microscope (AFM). Further, the respective surfaces were measured for surface roughness Ra. Next, the sample of the comparative example and the sample of the practical example were each heat-treated in a vacuum for three hours. The heat treatment was performed at a temperature of 225° C. Then, the respective surfaces of the sample of the comparative example and the sample of the practical example after the heat treatment were observed under the AFM. The respective surfaces were also measured for surface roughness Ra.

FIG. 9A and FIG. 9B each show an image of part of the surface of the sample of the comparative example, which was obtained by photographing under the AFM. FIG. 9A shows the surface of the sample of the comparative example before the heat treatment, while FIG. 9B shows the surface of the sample of the comparative example after the heat treatment. FIG. 10A and FIG. 10B each show an image of part of the surface of the sample of the practical example, which was obtained by photographing under the AFM. FIG. 10A shows the surface of the sample of the practical before the heat treatment, while FIG. 10B shows the surface of the sample of the practical example after the heat treatment. In FIG. 9A through FIG. 10B, the bright regions show portions of the Au layer that are elevated above a predetermined height, whereas the dark regions show portions of the Au layer that are lowered below the predetermined height.

As can be seen from a comparison between FIG. 9A and FIG. 9B, for the sample of the comparative example, the bright regions and the dark regions are distributed more unevenly, and the individual aggregates of the bright regions and the dark regions are larger in size after the heat treatment than before the heat treatment. Further, the surface roughness Ra of the surface of the sample of the comparative example measured 1.755 nm before the heat treatment and 3.174 nm after the heat treatment. From these facts, it can be seen that the Au layer of the sample of the comparative example was considerably deformed at high temperatures. The deformation of the Au layer is thought to be caused by aggregation in the Au layer.

On the other hand, for the sample of the practical example, it can be seen from a comparison between FIG. 10A and FIG. 10B that the distributions of the bright regions and the dark regions and the individual aggregate sizes of the bright regions and the dark regions are not significantly varied before and after the heat treatment. Further, the surface roughness Ra of the surface of the sample of the practical example measured 1.016 nm before the heat treatment and 1.314 nm after the heat treatment. From these facts, it can be seen that for the sample of the practical example, deformation of the Au layer at high temperatures was more inhibited when compared with the sample of the comparative example.

From the results of the first experiment above, it can be seen that the present embodiment is capable of better preventing the plasmon generator 50 from being deformed at high temperatures when compared with the case where the MgO layer 60 is not provided and the cladding of $SiO_2$ is in contact with the plasmon generator 50.

Now, the second experiment will be described. The second experiment was performed to evaluate the adhesion between the Au layer and the underlying layer. In this experiment, a tape test as described below was performed on each of the sample of the comparative example and the sample of the practical example. First, the samples were cut to have grid-shaped slits in the vertical and horizontal directions, which reached the underlying layer from the Au layer, so as to form 25 square regions each having a length of 5 mm and a width of 5 mm. Next, adhesive tape was attached to the Au layers of the samples with the slits formed thereon, and then the adhesive tape was peeled off. At this time, of the 25 regions of each sample, the number of regions in which the interface between the Au layer and the underlying layer was peeled off was checked.

Of the 25 regions of each sample, the number of regions in which the interface between the Au layer and the underlying layer was peeled off was two for the sample of the comparative example and zero for the sample of the practical example. From this result, it can be seen that the sample of the practical example is higher in adhesion between the underlying layer and the Au layer than the sample of the comparative example.

From the result of the second experiment above, it can be seen that the adhesion of the plasmon generator 50 to the underlying layer of MgO is higher than the adhesion of the plasmon generator 50 to the underlying layer of $SiO_2$. This also shows that the present embodiment is capable of better preventing the plasmon generator 50 from being deformed at high temperatures when compared with the case where the MgO layer 60 is not provided and the cladding of $SiO_2$ is in contact with the plasmon generator 50.

Now, the results of second and third simulations indicating the effects of the present embodiment will be described. To begin with, a description will be given of five models S, A, M, AS, and MS which were used in the second and third simulations. All of these models were designed to have a surrounding layer disposed around the plasmon generator 50 of Au. As will be described below, the conditions of the surrounding layers are different from one model to another.

The surrounding layer of Model S is made of $SiO_2$. The surrounding layer of Model A is made of $Al_2O_3$. The surrounding layer of Model M is made of MgO.

The surrounding layer of Model AS is made of an imaginary material having a linear thermal expansion coefficient and a Young's modulus the same as those of $Al_2O_3$, and a thermal conductivity the same as that of $SiO_2$. The surrounding layer of Model MS is made of an imaginary material having a linear thermal expansion coefficient and a Young's modulus the same as those of MgO, and a thermal conductivity the same as that of $SiO_2$.

Table 2 shows the thermal conductivity, the linear thermal expansion coefficient, the Young's modulus, and the Poisson's ratio of each of $SiO_2$, $Al_2O_3$ and MgO. Note that the values of thermal conductivity and Young's modulus in Table 2 were actually measured on each of the materials in their thin film state.

TABLE 2

| Material | Thermal conductivity (W/m · K) | Linear thermal expansion coefficient ($\times 10^{-6}$/K) | Young's modulus (GPa) | Poisson's ratio |
|---|---|---|---|---|
| $SiO_2$ | 1.3 | 3.5 | 73.5 | 0.25 |
| $Al_2O_3$ | 2.0 | 7.2 | 130 | 0.25 |
| MgO | 14.0 | 10 | 200 | 0.25 |

Model AS and Model MS were intended to evaluate the thermal stress produced in the plasmon generator 50 only from differences in linear thermal expansion coefficient and Young's modulus between $SiO_2$, $Al_2O_3$ and MgO, eliminating the effect of differences in thermal conductivity between $SiO_2$, $Al_2O_3$ and MgO.

Now, the second simulation will be described. The second simulation examined the maximum temperature of the temperature distribution in the plasmon generator 50 of each model when the plasmon generator 50 and the surrounding layer were heated under such a condition that the temperature distribution in the plasmon generator 50 of Model S had the maximum temperature of 220° C.

Figure 11:
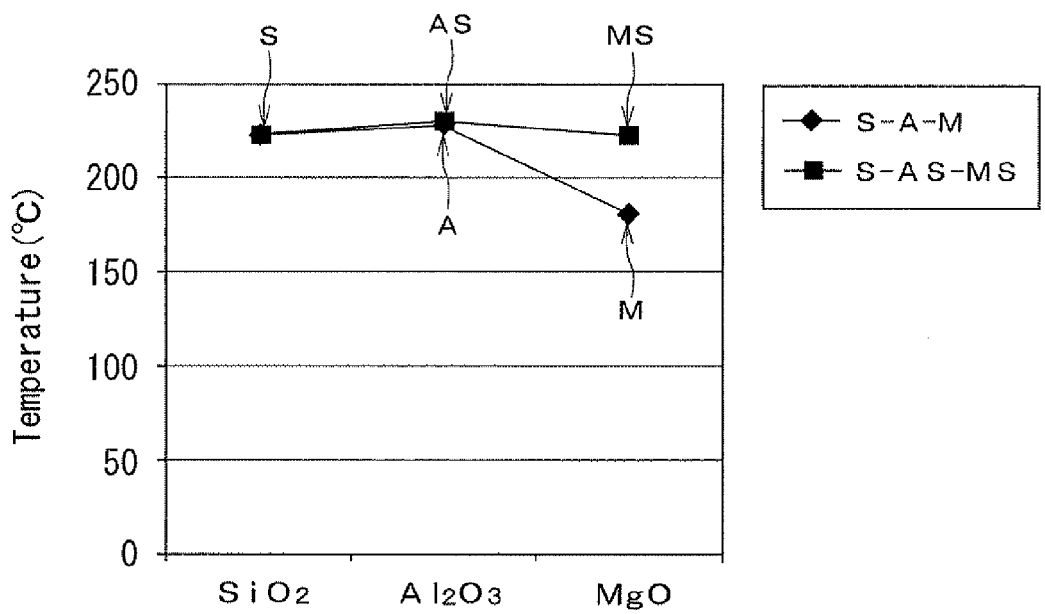
FIG. 11 is a characteristic diagram showing the temperature of the plasmon generator determined by a second simulation.

FIG. 11 shows the results of the second simulation. In FIG. 11, the horizontal axis represents the materials of the surrounding layers of Models S, A, and M, while the vertical axis represents the maximum temperature of the temperature distribution in the plasmon generator 50. FIG. 11 shows the temperature for Model AS at the same position on the horizontal axis as that for Model A, while showing the temperature for Model MS at the same position on the horizontal axis as that for Model M.

As shown in FIG. 11, the maximum temperature of the temperature distribution in the plasmon generator 50 of Model M is lower than the maximum temperature of the temperature distribution in the plasmon generator 50 of each of the other four models. This shows that the presence of the MgO layer 60 around the plasmon generator 50 as in the present embodiment serves to prevent a rise in temperature of the plasmon generator 50 better than in the case where an $SiO_2$ layer or an $Al_2O_3$ layer is present around the plasmon generator 50.

The third simulation will now be described. The third simulation was performed to examine the thermal stress produced in the plasmon generator 50 of each model when the plasmon generator 50 and the surrounding layer were heated under the condition of the second simulation. The thermal stress was evaluated by the von Mises stress $\sigma_{VM}$.

Figure 12:
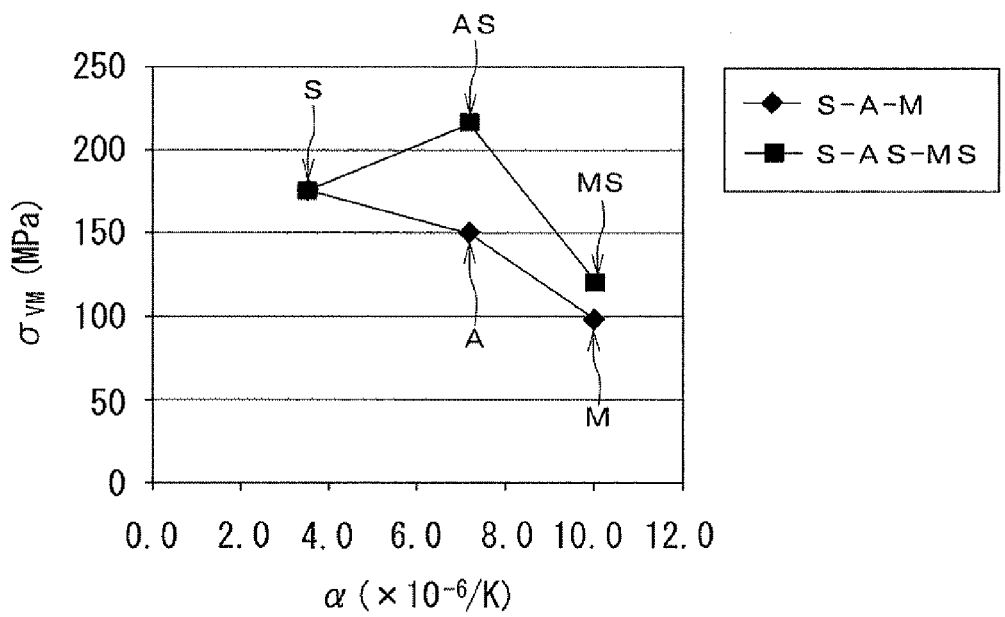
FIG. 12 is a characteristic diagram showing the relationship between linear thermal expansion coefficient and von Mises stress determined by a third simulation.

FIG. 12 shows the results of the third simulation. In FIG. 12, the horizontal axis represents the linear thermal expansion coefficient α, while the vertical axis represents the von Mises stress $\sigma_{VM}$. As shown in FIG. 12, the von Mises stress $\sigma_{VM}$ of Model M is less than that of each of Models S and A.

Further, a comparison between Models S, AS and MS, in which the materials of the surrounding layer have the same thermal conductivity, shows that the von Mises stress $\sigma_{VM}$ of Model MS is less than that of each of Models S and AS. This means that even when the thermal stress produced in the plasmon generator 50 is evaluated only from differences in linear thermal expansion coefficient and Young's modulus between $SiO_2$, $Al_2O_3$ and MgO with the effects of differences in thermal conductivity eliminated, the thermal stress produced in the plasmon generator 50 is smaller in the case where the surrounding layer is made of MgO than in the case where the surrounding layer is made of $SiO_2$ or $Al_2O_3$.

From the results of the third simulation, it can be seen that the presence of the MgO layer 60 around the plasmon generator 50 as in the present embodiment serves to more reduce the thermal stress produced in the plasmon generator 50 than in the case where an $SiO_2$ layer or an $Al_2O_3$ layer is present around the plasmon generator 50. This is mainly because MgO is closer to Au in linear thermal expansion coefficient than are $SiO_2$ and $Al_2O_3$.

According to the present embodiment, as can be seen from the results of the second and third simulations, it is possible to prevent a rise in temperature of the plasmon generator 50 and reduce the thermal stress produced in the plasmon generator 50 better than in case where the MgO layer 60 is not provided and the cladding formed of $SiO_2$ or $Al_2O_3$ is in contact with the plasmon generator 50. The present embodiment thus makes it possible to prevent the plasmon generator 50 from being deformed at high temperatures.

Second Embodiment

Figure 13:
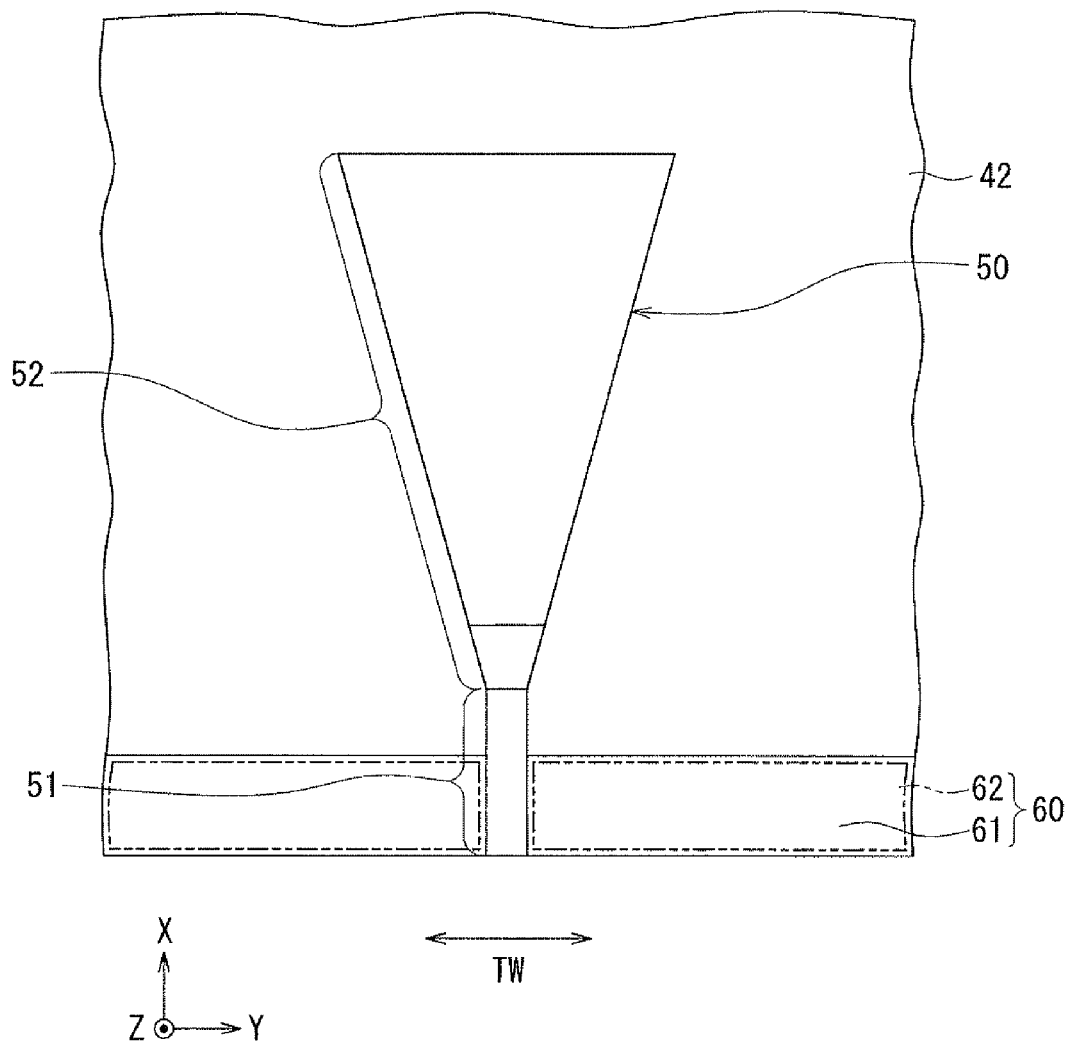
FIG. 13 is a plan view showing the main part of a thermally-assisted magnetic recording head according to a second embodiment of the invention.
Figure 14:
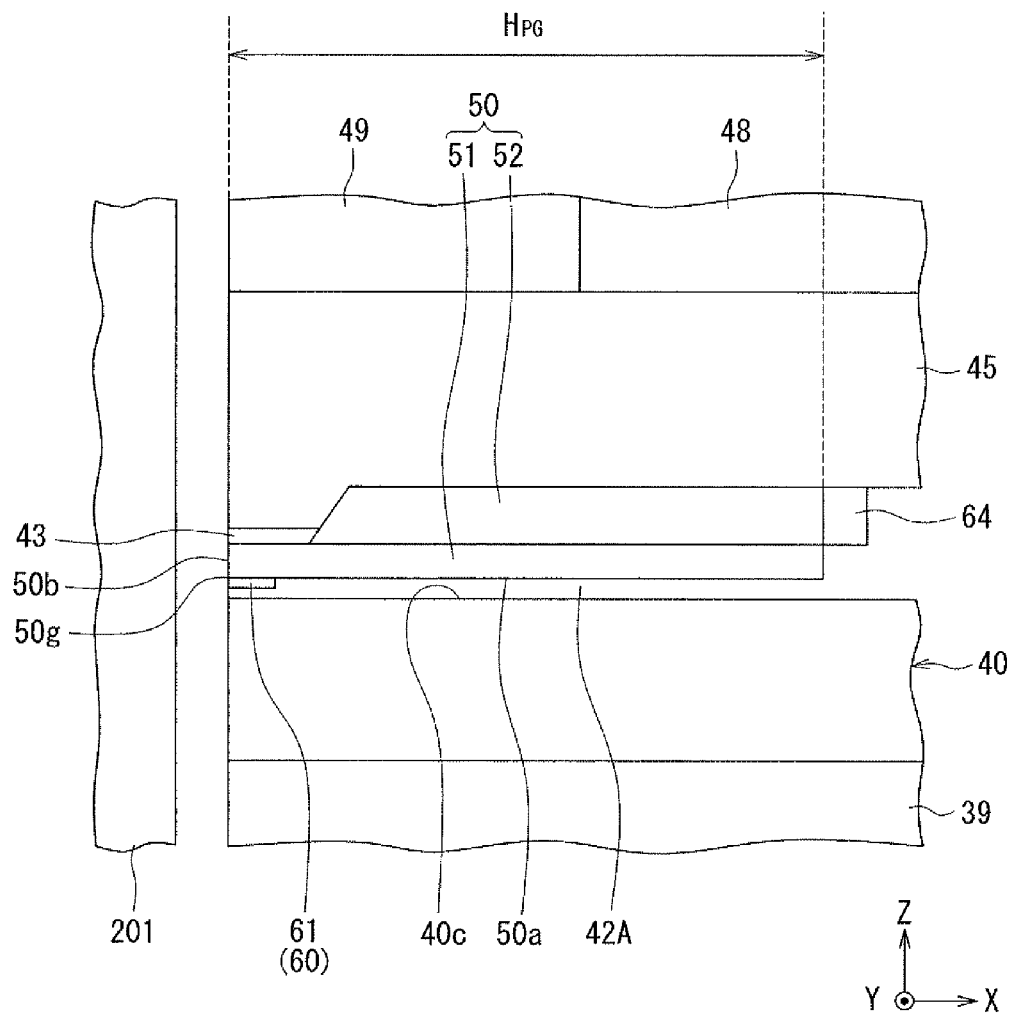
FIG. 14 is a cross-sectional view showing the main part of the thermally-assisted magnetic recording head according to the second embodiment of the invention.

A second embodiment of the present invention will now be described with reference to FIG. 13 and FIG. 14. FIG. 13 is a plan view showing the main part of the thermally-assisted magnetic recording head according to the present embodiment. FIG. 14 is a cross-sectional view showing the main part of the thermally-assisted magnetic recording head according to the present embodiment.

The configuration of the thermally-assisted magnetic recording head according to the present embodiment differs from that of the head according to the first embodiment in the following ways. In the present embodiment, the first layer 61 of the MgO layer 60 has a length in the X direction smaller than the length $H_{PG}$ of the plasmon generator 50. The first layer 61 is in contact with part of the plasmon exciting part 50a or the bottom surface of the first portion 51 of the plasmon generator 50 in the vicinity of the medium facing surface 12a. Further, the second layer 62 of the MgO layer 60 has a length in the X direction equal to that of the first layer 61, which is smaller than the length $H_{PG}$ of the plasmon generator 50. The second layer 62 is in contact with part of each of the first and second side surfaces of the first portion 51 in the vicinity of the medium facing surface 12a.

In the present embodiment, in particular, the length of each of the first layer 61 and the second layer 62 in the X direction is smaller than the distance between the medium facing surface 12a and an end of the second portion 52 of the plasmon generator 50 closest to the medium facing surface 12a. The dielectric layer 64 (see FIG. 1) may be disposed on the cladding layer 42. Alternatively, the insulating layer 44 (see FIG. 8) may be interposed between the dielectric layer 64 and the cladding layer 42.

A portion of the plasmon generator 50 near the front end face 50b, which will hereinafter be referred to as the near front end portion, particularly tends to become hot. Further, a deformation of the near front end portion, in particular, would impair the function of the plasmon generator 50. Thus, it is necessary to prevent particularly the near front end portion from being deformed due to a temperature rise. In the present embodiment, the MgO layer 60 is in contact with part of the outer surface of the plasmon generator 50 excluding the near-field light generating part 50g, the part being near the front end face 50b. According to the present embodiment, it is thereby possible to prevent the near front end portion from being deformed due to a temperature rise.

The remainder of configuration, function and effects of the present embodiment are similar to those of the first embodiment.

Third Embodiment

Figure 15:
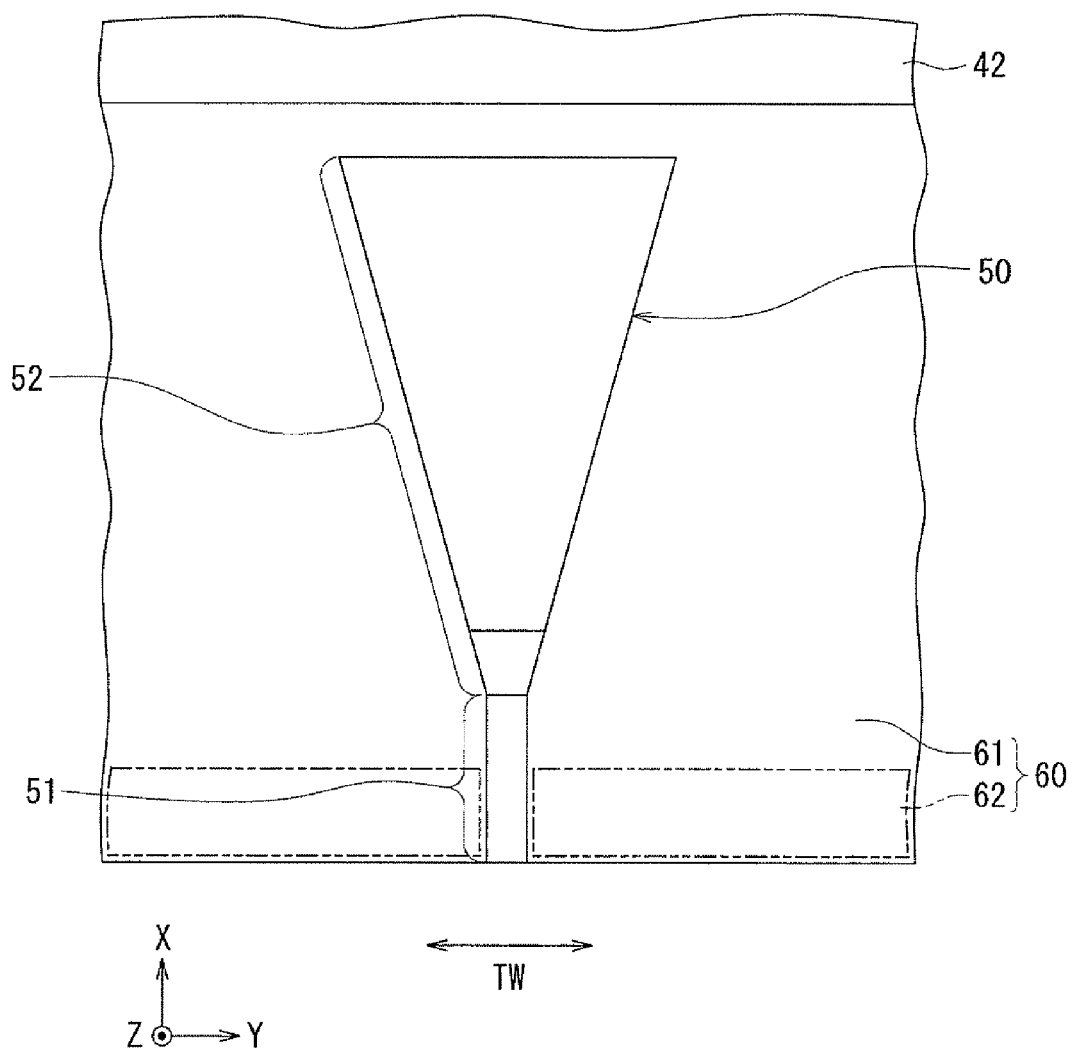
FIG. 15 is a plan view showing the main part of a thermally-assisted magnetic recording head according to a third embodiment of the invention.

A third embodiment of the present invention will now be described with reference to FIG. 15. FIG. 15 is a plan view showing the main part of the thermally-assisted magnetic recording head according to the present embodiment. In the thermally-assisted magnetic recording head according to the present embodiment, the MgO layer 60 includes the first layer 61 described in the first embodiment section and the second layer 62 described in the second embodiment section.

In the present embodiment, in particular, the second layer 62 has a length in the X direction smaller than the distance between the medium facing surface 12a and the end of the second portion 52 of the plasmon generator 50 closest to the medium facing surface 12a. The dielectric layer 64 (see FIG. 1) may be disposed on the first layer 61. Alternatively, the insulating layer 44 (see FIG. 8) may be interposed between the dielectric layer 64 and the first layer 61.

The remainder of configuration, function and effects of the present embodiment are similar to those of the first or second embodiment.

Fourth Embodiment

Figure 16:
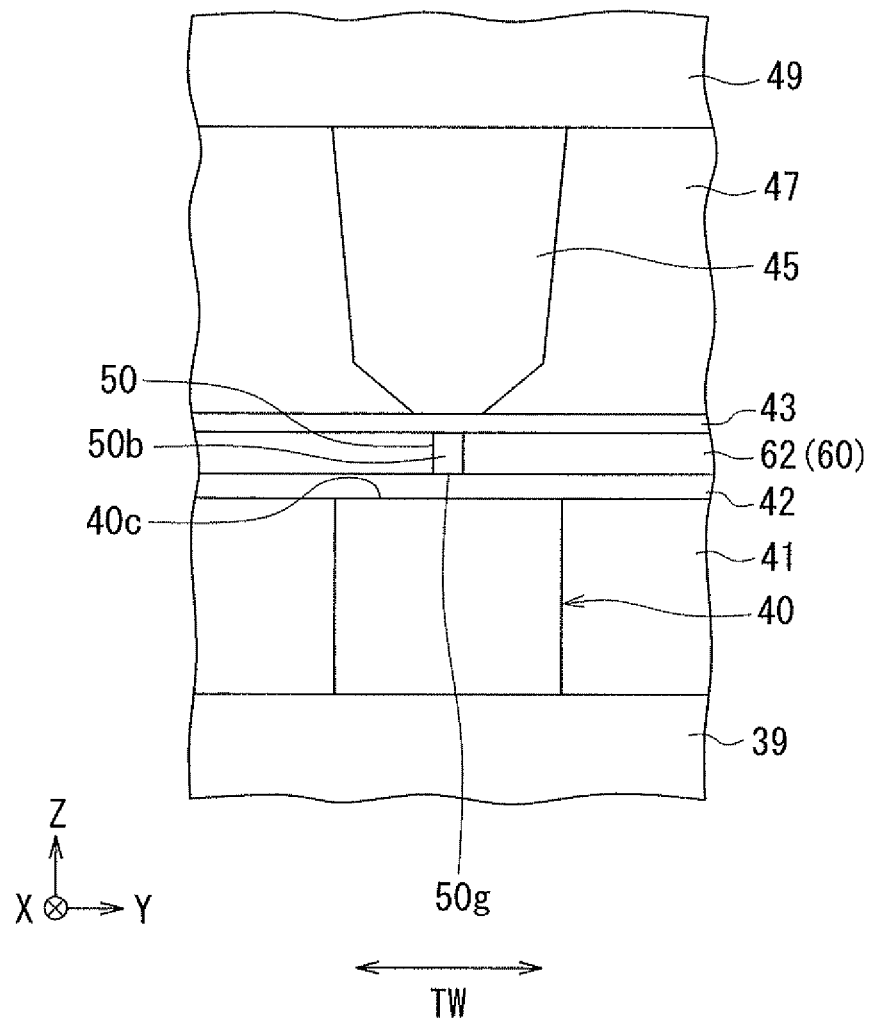
FIG. 16 is a front view showing the main part of a thermally-assisted magnetic recording head according to a fourth embodiment of the invention.
Figure 17:
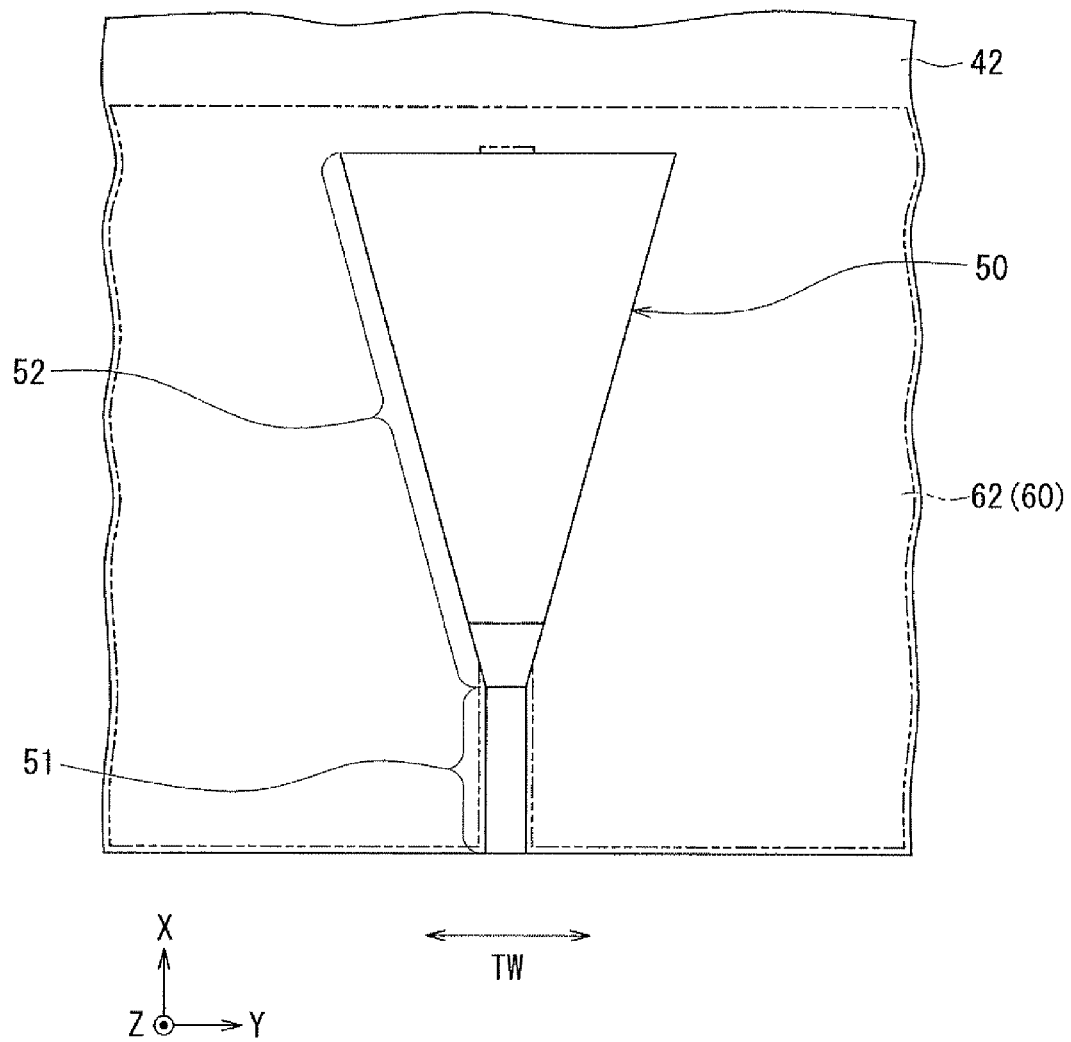
FIG. 17 is a plan view showing the main part of the thermally-assisted magnetic recording head according to the fourth embodiment of the invention.
Figure 18:
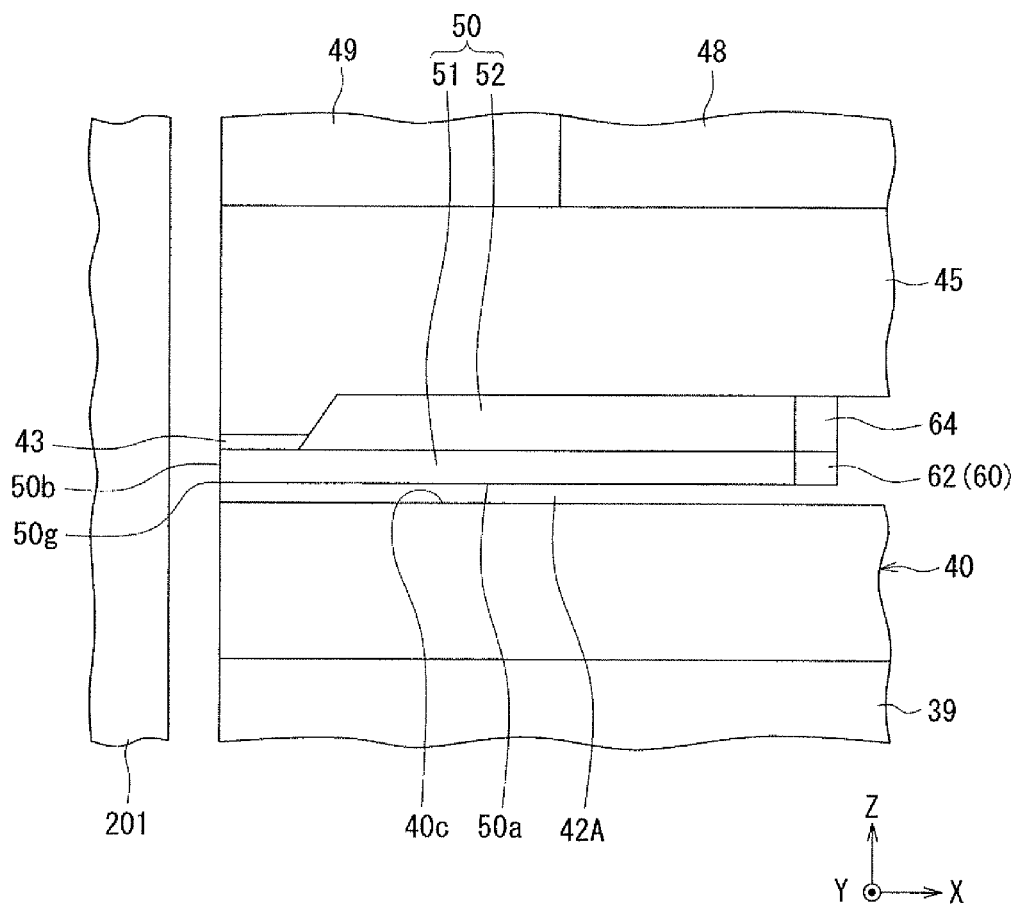
FIG. 18 is a cross-sectional view showing the main part of the thermally-assisted magnetic recording head according to the fourth embodiment of the invention.

A fourth embodiment of the present invention will now be described with reference to FIG. 16 to FIG. 18. FIG. 16 is a front view showing the main part of the thermally-assisted magnetic recording head according to the present embodiment. FIG. 17 is a plan view showing the main part of the thermally-assisted magnetic recording head according to the present embodiment. FIG. 18 is a cross-sectional view showing the main part of the thermally-assisted magnetic recording head according to the present embodiment.

The MgO layer 60 of the present embodiment does not have the first layer 61, and is composed only of the second layer 62 described in the first embodiment section. The second layer 62 is disposed on the cladding layer 42. Only the interposition part 42A is interposed between the core 40 and the plasmon generator 50.

The remainder of configuration, function and effects of the present embodiment are similar to those of the first embodiment.

Fifth Embodiment

Figure 19:
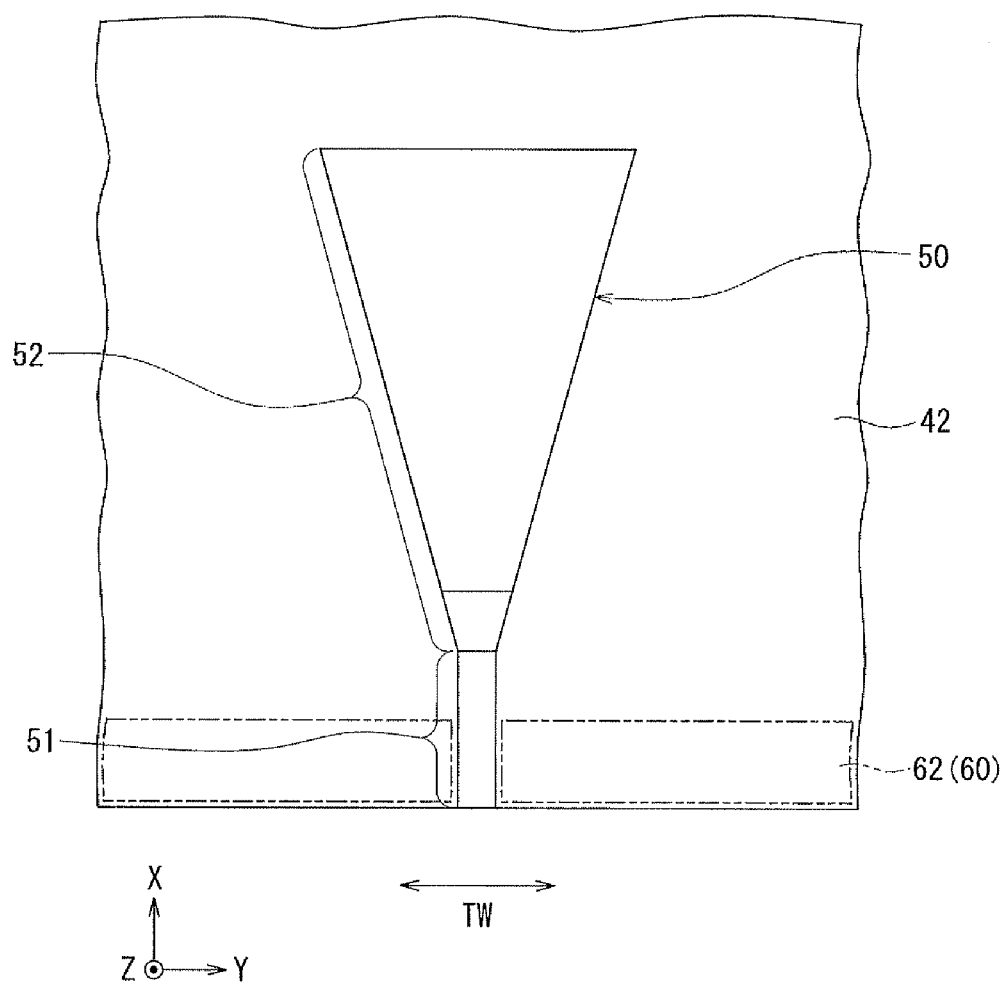
FIG. 19 is a plan view showing the main part of a thermally-assisted magnetic recording head according to a fifth embodiment of the invention.

A fifth embodiment of the present invention will now be described with reference to FIG. 19. FIG. 19 is a plan view showing the main part of the thermally-assisted magnetic recording head according to the present embodiment. The MgO layer 60 of the present embodiment does not have the first layer 61 as with the fourth embodiment, and is composed only of the second layer 62 described in the second embodiment section. The remainder of configuration, function and effects of the present embodiment are similar to those of the second or fourth embodiment.

Sixth Embodiment

Figure 20:
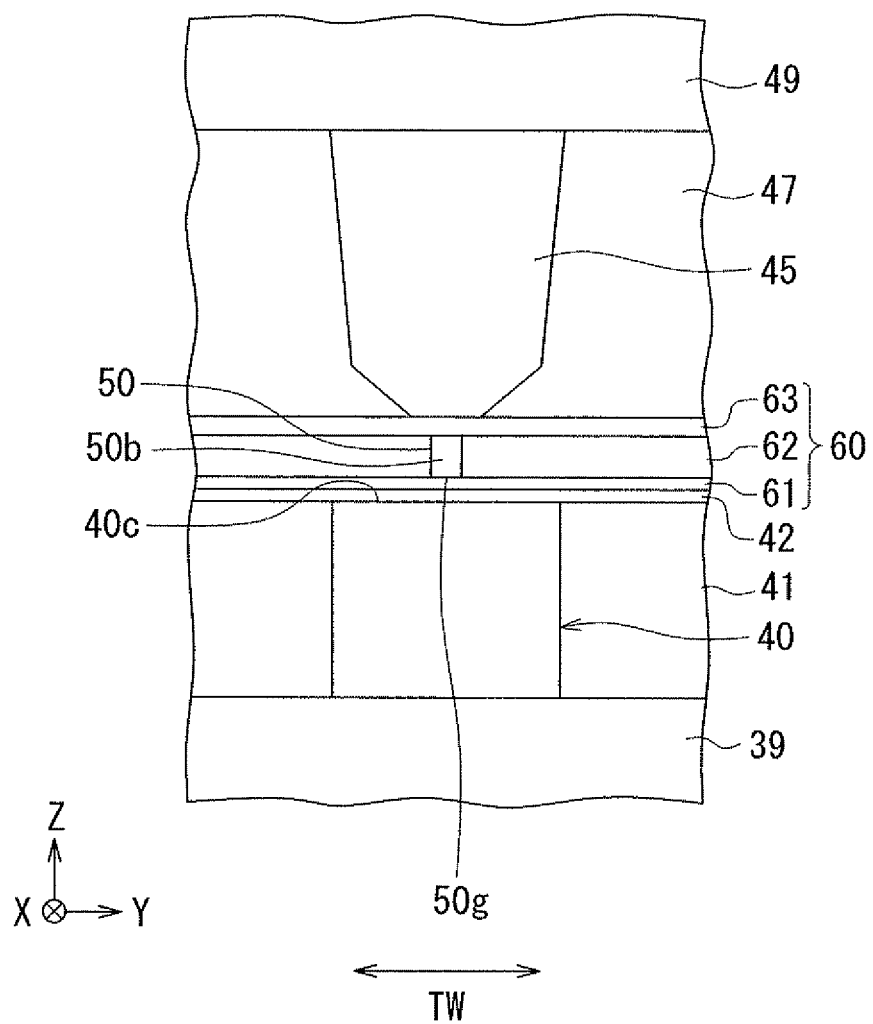
FIG. 20 is a front view showing the main part of a thermally-assisted magnetic recording head according to a sixth embodiment of the invention.

A sixth embodiment of the present invention will now be described with reference to FIG. 20. FIG. 20 is a front view showing the main part of the thermally-assisted magnetic recording head according to the present embodiment. The configuration of the thermally-assisted magnetic recording head according to the present embodiment is the same as that of the thermally-assisted magnetic recording head according to any of the first to third embodiments except the following differences. The thermally-assisted magnetic recording head according to the present embodiment does not have the insulating layer 43 described in the first embodiment section.

The MgO layer 60 of the present embodiment has a third layer 63 in addition to the first layer 61 and the second layer 62. The third layer 63 is interposed between the plasmon generator 50 and the magnetic pole 45, and lies on the second layer 62 and the plasmon generator 50. Although not illustrated, the length of the third layer 63 in the X direction may be greater than the length $H_{PG}$ (see FIG. 4 and FIG. 14) of the plasmon generator 50, or may be smaller than or equal to $H_{PG}$. The third layer 63 is in contact with at least the top surface of the first portion 51 of the plasmon generator 50. Where the length of the third layer 63 in the X direction is greater than $H_{PG}$, the third layer 63 is in contact with the top surface of the first portion 51 of the plasmon generator 50 and also the front end face and the top surface of the second portion 52 (see FIG. 3, FIG. 13 and FIG. 15) of the plasmon generator 50.

The remainder of configuration, function and effects of the present embodiment are similar to those of any of the first to third embodiments.

Seventh Embodiment

Figure 21:
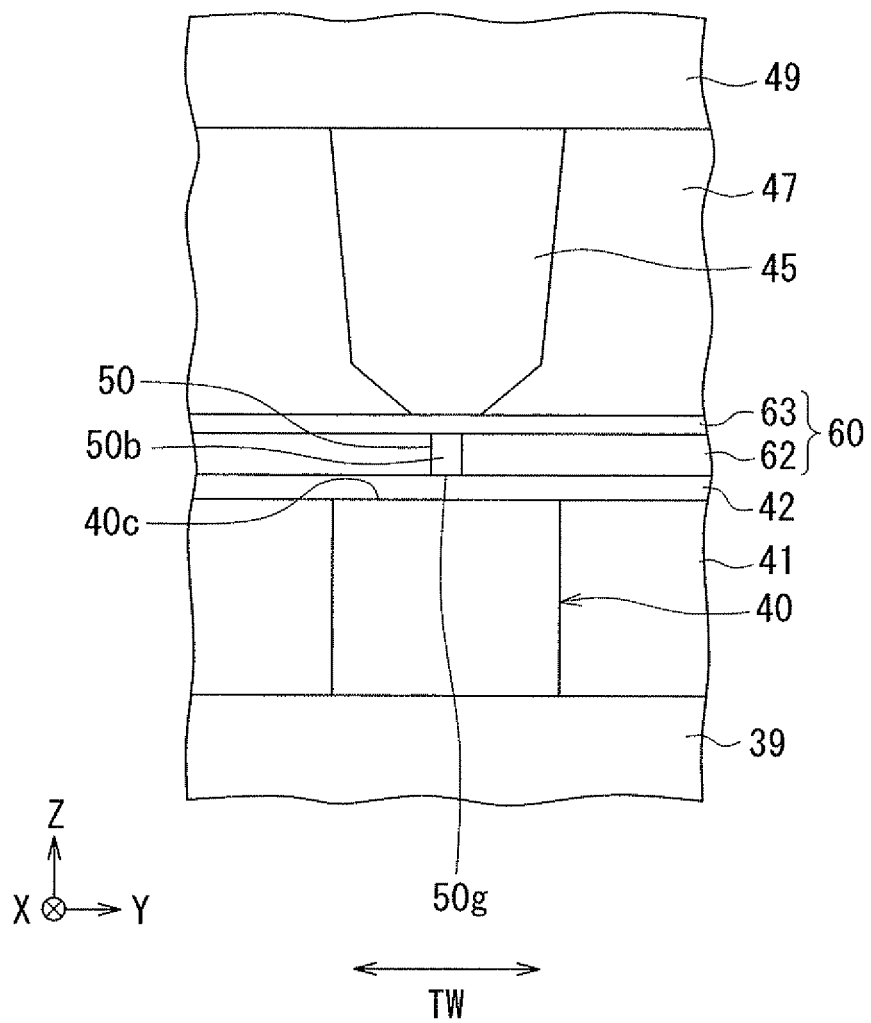
FIG. 21 is a front view showing the main part of a thermally-assisted magnetic recording head according to a seventh embodiment of the invention.

A seventh embodiment of the present invention will now be described with reference to FIG. 21. FIG. 21 is a front view showing the main part of the thermally-assisted magnetic recording head according to the present embodiment. The configuration of the thermally-assisted magnetic recording head according to the present embodiment is the same as that of the thermally-assisted magnetic recording head according to the fourth or fifth embodiment except the following differences. The thermally-assisted magnetic recording head according to the present embodiment does not have the insulating layer 43 as with the sixth embodiment. The MgO layer 60 of the present embodiment has the third layer 63 described in the sixth embodiment section, in addition to the second layer 62.

The remainder of configuration, function and effects of the present embodiment are similar to those of any of the fourth to sixth embodiments.

Eighth Embodiment

Figure 23:
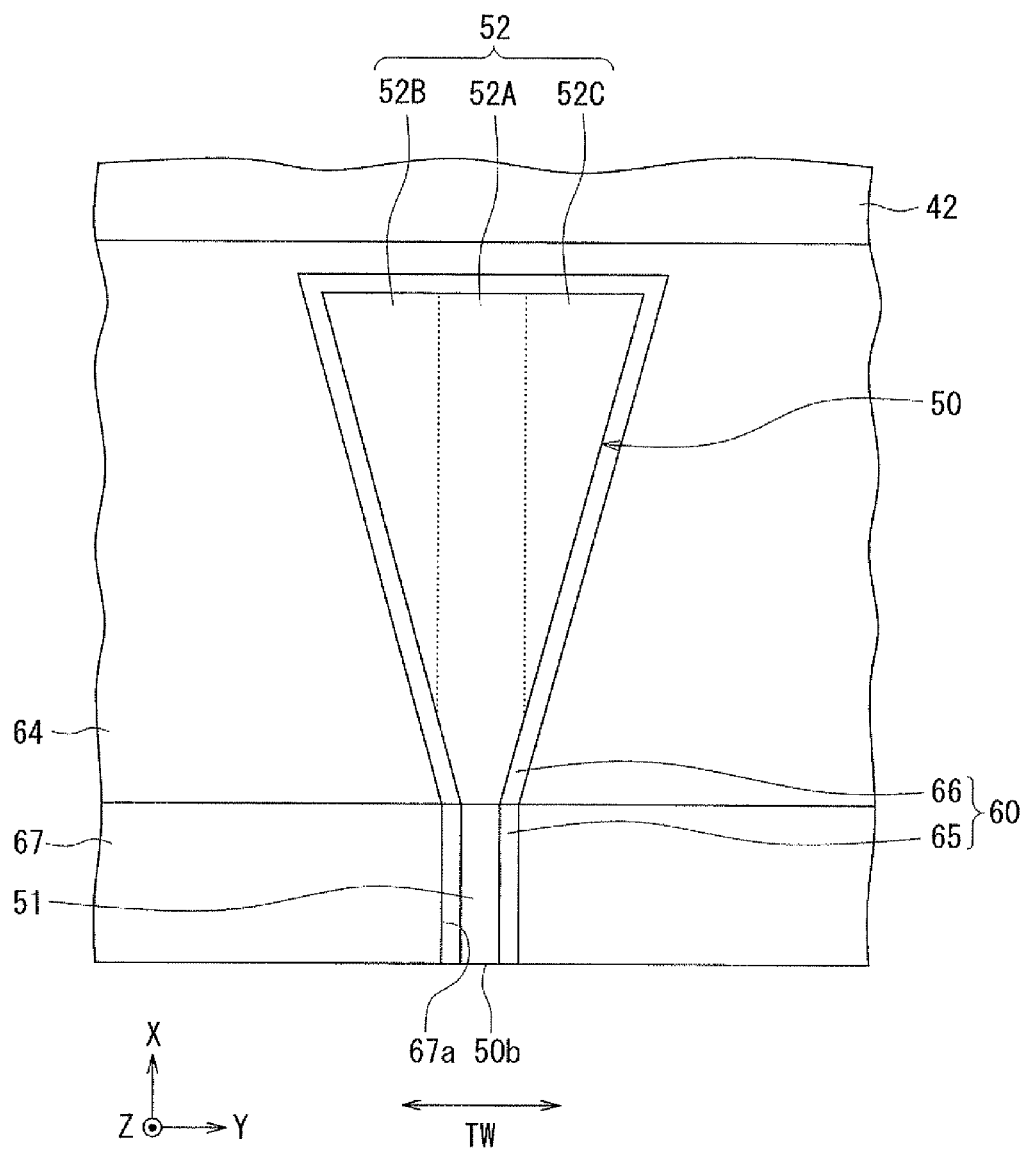
FIG. 23 is a plan view showing the main part of the thermally-assisted magnetic recording head according to the eighth embodiment of the invention.

An eighth embodiment of the present invention will now be described with reference to FIG. 22 and FIG. 23. FIG. 22 is a front view showing the main part of the thermally-assisted magnetic recording head according to the present embodiment. FIG. 23 is a plan view showing the main part of the thermally-assisted magnetic recording head according to the present embodiment.

The configuration of the thermally-assisted magnetic recording head according to the present embodiment differs from that of the head according to the first embodiment in the following ways. The MgO layer 60 of the present embodiment has a first layer 65 and a second layer 66 in place of the first layer 61 and the second layer 62 of the first embodiment. Further, the thermally-assisted magnetic recording head according to the present embodiment has a dielectric layer 67 disposed on the cladding layer 42. The dielectric layer 67 has an opening 67a for exposing the top surface of the interposition part 42A of the cladding layer 42. The opening 67a has a size sufficient for accommodating the first portion 51 of the plasmon generator 50. The opening 67a has a first wall face located away from the medium facing surface 12a, and a second and a third wall face located on opposite sides of the first wall face in the track width direction TW and connecting the first wall face to the medium facing surface 12a. The dielectric layer 67 is formed of alumina or $SiO_2$, for example.

The first layer 65 of the MgO layer 60 is disposed along the first to third wall faces of the opening 67a of the dielectric layer 67 and the top surface of the interposition part 42A. The first layer 65 has a thickness in the range of 5 to 100 nm, for example. In the present embodiment, the first portion 51 of the plasmon generator 50 is accommodated in the opening 67a such that the first layer 65 is interposed between the interposition part 42A and the dielectric layer 67. The surface of the first layer 65 facing the first portion 51 is in contact with the plasmon exciting part 50a or the bottom surface of the first portion 51 and also the first side surface, the second side surface and the rear end face of the first portion 51.

Further, in the present embodiment, the dielectric layer 64 is disposed on the dielectric layer 67. The second layer 66 of the MgO layer 60 is interposed between the second portion 52 of the plasmon generator 50 and the dielectric layer 64. The second layer 66 has a thickness in the range of 5 to 100 nm, for example. The surface of the second layer 66 facing the second portion 52 is in contact with the first side, the second side and the rear end face of the main body 52A of the second portion 52 and also the bottom surface, the side surface and the rear end face of each of the extended portions 52B and 52C of the second portion 52. Further, in the present embodiment, the insulating layer 43 lies on the first portion 51, the first layer 65 and the dielectric layer 67.

In the present embodiment, the MgO layer 60 may have the third layer 63 described in the sixth embodiment section, in addition to the first layer 65 and the second layer 66. In this case, the thermally-assisted magnetic recording head does not have the insulating layer 43. The remainder of configuration, function and effects of the present embodiment are similar to those of the first or sixth embodiment.

Ninth Embodiment

Figure 24:
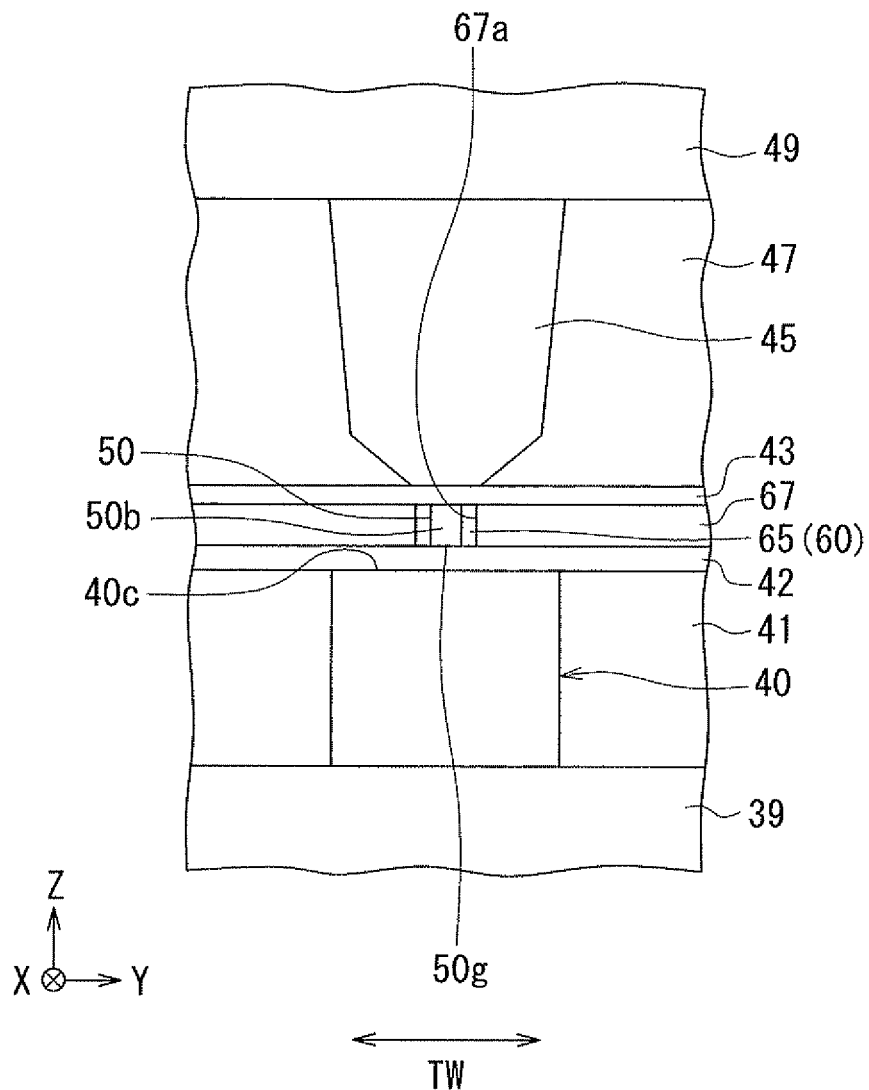
FIG. 24 is a front view showing the main part of a thermally-assisted magnetic recording head according to a ninth embodiment of the invention.

A ninth embodiment of the present invention will now be described with reference to FIG. 24. FIG. 24 is a front view showing the main part of the thermally-assisted magnetic recording head according to the present embodiment. The thermally-assisted magnetic recording head according to the present embodiment is different from the head according to the eighth embodiment in that the first layer 65 of the MgO layer 60 is not interposed between the plasmon exciting part 50a or the bottom surface of the first portion 51 of the plasmon generator 50 and the top surface of the interposition part 42A. The surface of the first layer 65 facing the first portion 51 is in contact with the first side surface, the second side surface and the rear end face of the first portion 51. The remainder of configuration, function and effects of the present embodiment are similar to those of the eighth embodiment.

The present invention is not limited to the foregoing embodiments, and various modifications may be made thereto. For example, as far as the requirements of the appended claims are met, the shapes and locations of the core of the waveguide, the plasmon generator, the MgO layer and the magnetic pole are not limited to the examples illustrated in the foregoing embodiments, and can be arbitrarily chosen.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A near-field light generator comprising a waveguide, a plasmon generator, and an MgO layer, wherein
    the waveguide includes a core through which light propagates, and a cladding,
    the plasmon generator has an outer surface including a plasmon exciting part and a near-field light generating part, and is configured so that a surface plasmon is excited on the plasmon exciting part based on the light propagating through the core, and the near-field light generating part generates near-field light based on the surface plasmon,
    the MgO layer is in contact with at least part of the outer surface of the plasmon generator excluding the near-field light generating part, and not in contact with the core, and
    the cladding is lower in refractive index than the core and the MgO layer.

2. The near-field light generator according to claim 1, wherein the cladding has an interposition part interposed between the core and the plasmon generator.

3. The near-field light generator according to claim 2, wherein
    the core has an evanescent light generating surface that generates evanescent light based on the light propagating through the core,
    the plasmon exciting part is opposed to the evanescent light generating surface with the interposition part interposed therebetween, and
    the surface plasmon is excited on the plasmon exciting part through coupling with the evanescent light generated by the evanescent light generating surface.

4. The near-field light generator according to claim 2, wherein at least part of the MgO layer is interposed between the interposition part and the plasmon generator.

5. A thermally-assisted magnetic recording head comprising:
    a medium facing surface that faces a magnetic recording medium;
    a magnetic pole having an end face located in the medium facing surface, the magnetic pole producing a write magnetic field for writing data on the magnetic recording medium;
    a waveguide;
    a plasmon generator; and
    an MgO layer, wherein
    the waveguide includes a core through which light propagates, and a cladding,
    the plasmon generator has an outer surface including a plasmon exciting part and a near-field light generating part, and is configured so that a surface plasmon is excited on the plasmon exciting part based on the light propagating through the core, and the near-field light generating part generates near-field light based on the surface plasmon,
    the MgO layer is in contact with at least part of the outer surface of the plasmon generator excluding the near-field light generating part, and not in contact with the core, and
    the cladding is lower in refractive index than the core and the MgO layer.

6. The thermally-assisted magnetic recording head according to claim 5, wherein the cladding has an interposition part interposed between the core and the plasmon generator.

7. The thermally-assisted magnetic recording head according to claim 6, wherein
    the core has an evanescent light generating surface that generates evanescent light based on the light propagating through the core,
    the plasmon exciting part is opposed to the evanescent light generating surface with the interposition part interposed therebetween, and
    the surface plasmon is excited on the plasmon exciting part through coupling with the evanescent light generated by the evanescent light generating surface.

8. The thermally-assisted magnetic recording head according to claim 6, wherein at least part of the MgO layer is interposed between the interposition part and the plasmon generator.

9. A head gimbal assembly comprising: the thermally-assisted magnetic recording head according to claim 5; and a suspension that supports the thermally-assisted magnetic recording head.

10. A magnetic recording device comprising: a magnetic recording medium; the thermally-assisted magnetic recording head according to claim 5; and a positioning device that supports the thermally-assisted magnetic recording head and positions the thermally-assisted magnetic recording head with respect to the magnetic recording medium.

* * * * *